United States Patent
Eppolito et al.

(10) Patent No.: US 8,621,355 B2
(45) Date of Patent: Dec. 31, 2013

(54) AUTOMATIC SYNCHRONIZATION OF MEDIA CLIPS

(75) Inventors: Aaron M. Eppolito, Santa Cruz, CA (US); Iroro F. Orife, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 19 days.

(21) Appl. No.: 13/019,986

(22) Filed: Feb. 2, 2011

(65) Prior Publication Data

US 2012/0198317 A1     Aug. 2, 2012

(51) Int. Cl.
*G06F 17/00*     (2006.01)

(52) U.S. Cl.
USPC .......................................... 715/723; 715/203

(58) Field of Classification Search
USPC .................................. 715/723–726, 202–203
See application file for complete search history.

(56) References Cited

U.S. PATENT DOCUMENTS

| | | | |
|---|---|---|---|
| 5,111,292 A | 5/1992 | Kuriacose et al. | |
| 5,519,828 A | 5/1996 | Rayner | |
| 5,572,261 A | 11/1996 | Cooper | |
| 5,594,627 A | 1/1997 | Le | |
| 5,659,793 A | 8/1997 | Escobar et al. | |
| 5,664,216 A | 9/1997 | Blumenau | |
| 5,682,326 A | 10/1997 | Klingler et al. | |
| 5,764,965 A | 6/1998 | Poimboeuf et al. | |
| 5,768,292 A | 6/1998 | Galbi | |
| 5,826,102 A | 10/1998 | Escobar et al. | |
| 5,861,880 A * | 1/1999 | Shimizu et al. | 715/202 |
| 5,883,804 A | 3/1999 | Christensen | |
| 5,893,062 A | 4/1999 | Bhadkamkar et al. | |
| 5,930,446 A | 7/1999 | Kanda | |
| 5,969,716 A | 10/1999 | Davis et al. | |
| 6,134,380 A | 10/2000 | Kushizaki | |
| 6,134,522 A | 10/2000 | Leckschat | |
| 6,144,375 A | 11/2000 | Jain et al. | |
| 6,150,598 A | 11/2000 | Suzuki et al. | |
| 6,154,601 A | 11/2000 | Yaegashi et al. | |
| 6,184,937 B1 | 2/2001 | Williams et al. | |
| 6,188,396 B1 | 2/2001 | Boezeman et al. | |

(Continued)

FOREIGN PATENT DOCUMENTS

| | | |
|---|---|---|
| GB | 2464123 | 4/2010 |
| WO | WO 2008/002803 | 1/2008 |

(Continued)

OTHER PUBLICATIONS

Portions of prosecution history of U.S. Appl. No. 10/407,954, filed Jul. 20, 2006, Black, David Robert.

(Continued)

*Primary Examiner* — Manglesh M Patel
(74) *Attorney, Agent, or Firm* — Blakely, Sokoloff, Taylor & Zafman LLP

(57) ABSTRACT

For media clips captured by several media recording devices, a novel method for organizing the captured media clips is presented. The method arranges the media clips into sequences according to content data associated with the media clips. The method further analyzes content data of the media clips in each sequence to identify a best candidate media clip from each sequence. The method performs one or more algorithms to determine whether the candidate media clips are related. The algorithms are also used to determine a time offset between the candidate clips. The method then synchronizes the sequences based on the time offset determined by the algorithms.

31 Claims, 25 Drawing Sheets

(56) References Cited

U.S. PATENT DOCUMENTS

| | | | |
|---|---|---|---|
| 6,243,032 B1 | 6/2001 | Uramoto et al. | |
| 6,262,776 B1 | 7/2001 | Griffits | |
| 6,351,765 B1 * | 2/2002 | Pietropaolo et al. | 709/218 |
| 6,392,710 B1 * | 5/2002 | Gonsalves et al. | 348/578 |
| 6,404,978 B1 | 6/2002 | Abe | |
| 6,429,902 B1 | 8/2002 | Har-Chen et al. | |
| 6,546,188 B1 | 4/2003 | Ishii et al. | |
| 6,577,735 B1 | 6/2003 | Bharat | |
| 6,630,963 B1 | 10/2003 | Billmaier | |
| 6,678,661 B1 | 1/2004 | Smith et al. | |
| 6,744,815 B1 | 6/2004 | Sackstein et al. | |
| 6,881,888 B2 | 4/2005 | Akazawa et al. | |
| 6,904,566 B2 | 6/2005 | Feller et al. | |
| 6,965,546 B2 * | 11/2005 | Tagawa et al. | 369/30.19 |
| 6,967,599 B2 | 11/2005 | Choi et al. | |
| 6,968,564 B1 | 11/2005 | Srinivasan | |
| 7,024,097 B2 | 4/2006 | Sullivan | |
| 7,142,250 B1 | 11/2006 | Black | |
| 7,194,676 B2 | 3/2007 | Fayan et al. | |
| 7,206,986 B2 | 4/2007 | Stemerdink et al. | |
| 7,272,843 B1 | 9/2007 | Nejime et al. | |
| 7,296,231 B2 * | 11/2007 | Loui et al. | 715/723 |
| 7,313,755 B2 | 12/2007 | Rahman et al. | |
| 7,317,840 B2 | 1/2008 | DeCegama | |
| 7,325,199 B1 | 1/2008 | Reid | |
| 7,336,264 B2 * | 2/2008 | Cajolet et al. | 345/173 |
| 7,383,509 B2 | 6/2008 | Foote et al. | |
| 7,549,123 B1 | 6/2009 | Stewart et al. | |
| 7,623,755 B2 | 11/2009 | Kuspa | |
| 7,668,869 B2 | 2/2010 | Weinberger et al. | |
| 7,821,574 B2 | 10/2010 | Black | |
| 7,836,389 B2 | 11/2010 | Howard et al. | |
| 7,870,589 B2 | 1/2011 | Ducheneaut et al. | |
| 7,945,142 B2 | 5/2011 | Finkelstein et al. | |
| 8,032,649 B2 * | 10/2011 | Gupta et al. | 709/231 |
| 8,205,148 B1 * | 6/2012 | Sharpe et al. | 715/203 |
| 8,311,983 B2 * | 11/2012 | Guzik | 707/630 |
| 2001/0036356 A1 | 11/2001 | Weaver et al. | |
| 2002/0008778 A1 | 1/2002 | Grigorian | |
| 2002/0023103 A1 * | 2/2002 | Gagne | 707/501.1 |
| 2002/0034144 A1 | 3/2002 | Kotani | |
| 2002/0101368 A1 | 8/2002 | Choi et al. | |
| 2002/0138795 A1 | 9/2002 | Wang | |
| 2002/0140719 A1 | 10/2002 | Amir et al. | |
| 2002/0168176 A1 | 11/2002 | Iizuka et al. | |
| 2002/0177967 A1 | 11/2002 | Fuchs et al. | |
| 2002/0188628 A1 | 12/2002 | Cooper et al. | |
| 2003/0018609 A1 | 1/2003 | Phillips et al. | |
| 2003/0049015 A1 | 3/2003 | Cote et al. | |
| 2003/0164845 A1 | 9/2003 | Fayan et al. | |
| 2004/0001106 A1 * | 1/2004 | Deutscher et al. | 345/838 |
| 2004/0027369 A1 | 2/2004 | Kellock et al. | |
| 2004/0114904 A1 | 6/2004 | Sun et al. | |
| 2004/0120554 A1 | 6/2004 | Lin et al. | |
| 2004/0122662 A1 | 6/2004 | Crockett | |
| 2004/0183825 A1 * | 9/2004 | Stauder et al. | 345/723 |
| 2004/0267952 A1 | 12/2004 | He et al. | |
| 2005/0042591 A1 | 2/2005 | Bloom et al. | |
| 2005/0273321 A1 | 12/2005 | Choi | |
| 2006/0008247 A1 | 1/2006 | Minami et al. | |
| 2006/0156374 A1 | 7/2006 | Hu et al. | |
| 2007/0250777 A1 | 10/2007 | Chen et al. | |
| 2007/0292106 A1 | 12/2007 | Finkelstein et al. | |
| 2008/0039964 A1 | 2/2008 | Charoenruengkit et al. | |
| 2008/0044155 A1 | 2/2008 | Kuspa | |
| 2009/0087161 A1 | 4/2009 | Roberts et al. | |
| 2009/0129601 A1 | 5/2009 | Ojala et al. | |
| 2009/0185790 A1 | 7/2009 | Kim | |
| 2010/0077289 A1 | 3/2010 | Das et al. | |
| 2010/0158471 A1 | 6/2010 | Ogikubo | |
| 2010/0183280 A1 | 7/2010 | Beauregard et al. | |
| 2010/0281381 A1 * | 11/2010 | Meaney et al. | 715/723 |
| 2010/0281386 A1 * | 11/2010 | Lyons et al. | 715/731 |
| 2010/0305729 A1 | 12/2010 | Glitsch et al. | |
| 2011/0013084 A1 | 1/2011 | Black | |
| 2011/0029883 A1 * | 2/2011 | Lussier et al. | 715/738 |
| 2011/0072037 A1 | 3/2011 | Lotzer | |
| 2011/0125818 A1 * | 5/2011 | Liebman | 707/829 |
| 2011/0239107 A1 * | 9/2011 | Phillips et al. | 715/234 |
| 2012/0210230 A1 * | 8/2012 | Matsuda et al. | 715/723 |

FOREIGN PATENT DOCUMENTS

| | | |
|---|---|---|
| WO | WO 2008/151416 | 12/2008 |
| WO | WO 2009/026159 | 2/2009 |
| WO | WO 2009/114134 | 9/2009 |

OTHER PUBLICATIONS

Portions of prosecution history of U.S. Appl. No. 11/561,885, filed Sep. 20, 2010, Black, David Robert.

Author Unknown, "Adobe Director 11: User Guide," Month Unknown, 2008, pp. 239-248, Adobe Systems Incorporated, San Jose, California, USA.

Author Unknown, "Adobe Premiere Pro CS3: User Guide," Apr. 1, 2008, pp. 182-215, Adobe Systems Incorporated, San Jose, California, USA.

Author Unkonwn, "Editing Stereoscopic 3D Video In Vegas Pro 9", Apr. 2, 2010, 6 pages, Sony Creative Software Inc., Madison, Wisconsin, USA.

Author Unknown, "iMovie '08 Getting Started," Month Unknown, 2008, pp. 1-50, Apple Inc., California, USA.

Casares, Juan, et al., "Simplifying Video Editing Using Metadata," Proceedings of Designing Interactive Systems (DIS 2002), Jun. 2002, pp. 157-166, London, Great Britain.

Kennedy, Lyndon, et al., "Less Talk, More Rock: Automated Organization of Community-Contributed Collections of Concert Videos", Proceedings of the 18th International Conference on World wide Web, Apr. 20-24, 2009, pp. 311-320, Madrid, Spain.

Long, Chris A., et al., "Video Editing Using Lenses and Semantic Zooming", Human Computer Interaction Institute, Carnegie Mellon University, Month Unknown, 2002, pp. 1-9, Pittsburgh, Pennsylvania, USA.

Myers, Brad A., et al., "A Multi-View Intelligent Editor for Digital Video Libraries," The First ACM+IEEE Joint Conference on Digital Libraries (JCDL'01), Jun. 24-28, 2001, pp. 106-115, Roanoke, Virginia, USA.

Strestha, Prarthana, et al., "Synchronization of Multi-Camera Video Recordings Based on Audio", Proceedings of the 15th International Conference on Multimedia, Sep. 23-28, 2007, pp. 545-548, Augsburg, Bavaria, Germany.

Wang, Yijin, et al. "My Videos—A System for Home Video Management", Proceedings of the 10th ACM International Conference on Multimedia, Dec. 1-6, 2002, pp. 412-413, Juan-les-Pins, France.

* cited by examiner

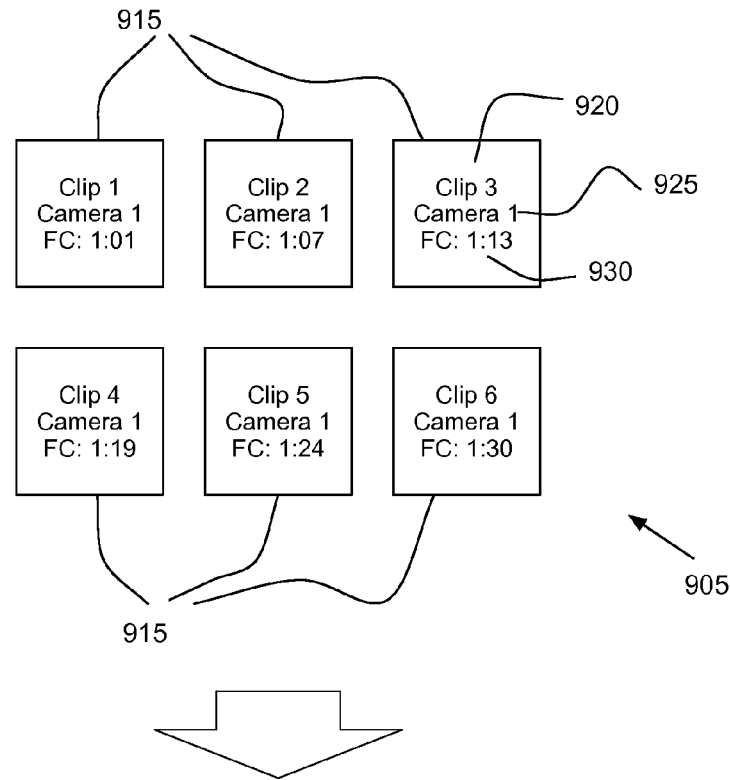
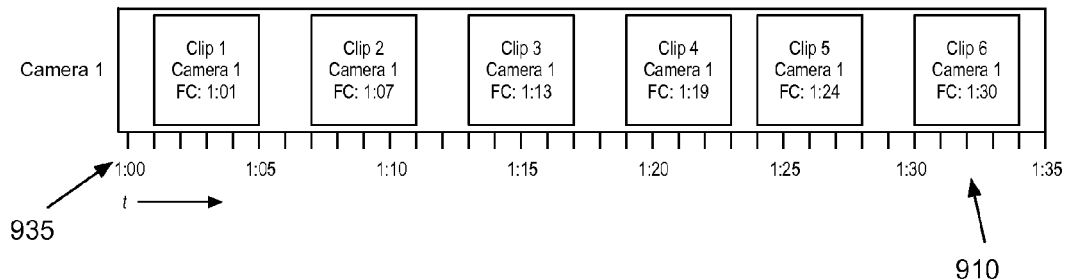
Figure 9

AUTOMATIC SYNCHRONIZATION OF MEDIA CLIPS

BACKGROUND

Digital graphic design, image editing, audio editing, and video editing applications (hereafter collectively referred to as media content editing applications or media editing applications) provide graphical designers, media artists, and other users with the necessary tools to create a variety of media content. Examples of such applications include Final Cut Pro® and iMovie®, both sold by Apple® Inc. These applications give users the ability to edit, combine, transition, overlay, and piece together different media content in a variety of manners to create a resulting media project. The resulting media project specifies a particular sequenced composition of any number of text, audio clips, images, or video content that is used to create a media presentation.

Various media editing applications facilitate such composition through electronic means. Specifically, a computer or other electronic device with a processor and computer readable storage medium executes the media content editing application. In so doing, the computer generates a graphical interface whereby editors digitally manipulate graphical representations of the media content to produce a desired result.

In many cases, editors use media-editing applications to edit a large volume of media clips recorded by several media recording devices. Often times, multiple media recording devices record the same event at the same time to produce multiple angles and effects. Furthermore, the use of multiple media recording devices provides a redundancy of media clips from which editors choose to create a master video. For instance, an editor chooses the audio recording from an auxiliary microphone because it provides the best sound quality for a particular scene, or the editor chooses a particular video recording because of a preferred angle from which the video is shot.

The use of multiple recording devices to record a single scene, however, produces a multitude of media clips to be analyzed. Editing/processing these media clips in an efficient and effective manner requires that the media clips be sorted and synchronized in relation to one another. Manually sorting and synchronizing such vast amounts of media clips even for a day's worth of recordings, as is typically done in the film industry, amounts to a very time consuming process.

BRIEF SUMMARY

Some embodiments of the invention provide a structured arrangement of media content items (e.g., audio clips, video clips, etc.). The arrangement includes a collection of media content items that have been recorded over a period of time. The arrangement includes multi-clips that represent multiple layers of media content items. Each layer of the multi-clip represents a different recording device.

Data reduction is performed on the media content items in some embodiments. Data reduction reduces the number of data samples that require analysis. The data reduction process includes sorting the media content items according to certain metadata included in the media content items. For instance, media content items determined to be from the same media recording device are grouped together. Additionally, media content items are arranged in chronological order according to available temporal data.

Once the media content items from the same sources are grouped together and sorted, one or more algorithms are performed to determine whether media content items recorded by different media recording devices are related to one another (e.g., two media clips recording the same event during an overlapping time period). These algorithms compare sets of audio signals (from video clips and/or audio clips) from different media recording devices in order to determine which media content items are sufficiently related so as to constitute an overlapping pair of media clips. Based on these algorithms, a comparison score is generated. The comparison score is evaluated against a threshold value to determine whether two media content items are sufficiently related.

In some embodiments, such algorithms are used to calculate a time offset to synchronize the related media content items on a common timeline. For example, the algorithms are used to identify how much time to offset a first media clip in order to align it with a second media clip. Examples of algorithms for comparing sets of media content items include cross correlation and phase correlation. Cross correlating or phase correlating two audio signals produces a correlation function that indicates the likelihood of match for all time offsets. The peak value of the correlation function, when it satisfies a threshold value, corresponds to the time offset that produces the most likely alignment of two audio signals.

The time offset values determined from the correlation functions are applied to corresponding media content items to synchronize the group of two or more related media content items. In some embodiments, alignment of pairs of overlapping media content items is further fine-tuned by applying the algorithms on each overlapping pair. The groups of synchronized items are arranged on a common timeline as multi-clips. The multi-clips are placed on the timeline in chronological order where each multi-clip is separated by a certain time gap. The sequence of multi-clips is presented to users as an organized collection of media content items for further editing.

The arrangement of media content items is initiated by a user through a media-editing application in some embodiments. The media-editing application includes a display area for displaying media content items stored in a media library display area. The timeline includes multiple tracks upon which graphical representations of the media clips that are analyzed for synchronization purposes are displayed.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purpose of explanation, several embodiments of the invention are set forth in the following figures.

FIG. 9 conceptually illustrates arranging media clips by file creation time data in some embodiments.

DETAILED DESCRIPTION

In the following description, numerous details are set forth for purpose of explanation. However, one of ordinary skill in the art will realize that the invention may be practiced without the use of these specific details. For instance, many of the examples illustrate synchronization of two sequences of media clips. One of ordinary skill will realize that this is merely an illustrative example, and that the invention can apply to multiple sequences of media clips representing multiple media recording sources. In other instances, well known structures and devices are shown in block diagram form in order to not obscure the description of the invention with unnecessary detail.

In order to synchronize media clips that include audio data, some embodiments provide a method for determining whether pairs of media clips are related to one another. The method performs algorithms on the audio signals of the pair to calculate a time offset that best aligns the pair of clips. For instance, a phase correlation algorithm in some embodiments produces a correlation function where the peak value of the function corresponds to a time offset, that when applied, produces the best alignment between the two media clips.

In some embodiments of the invention, synchronization is performed by a computing device. Such a computing device can be an electronic device that includes one or more integrated circuits (IC) or a computer executing a program, such as a media editing application.

I. Overview

Figure 1:
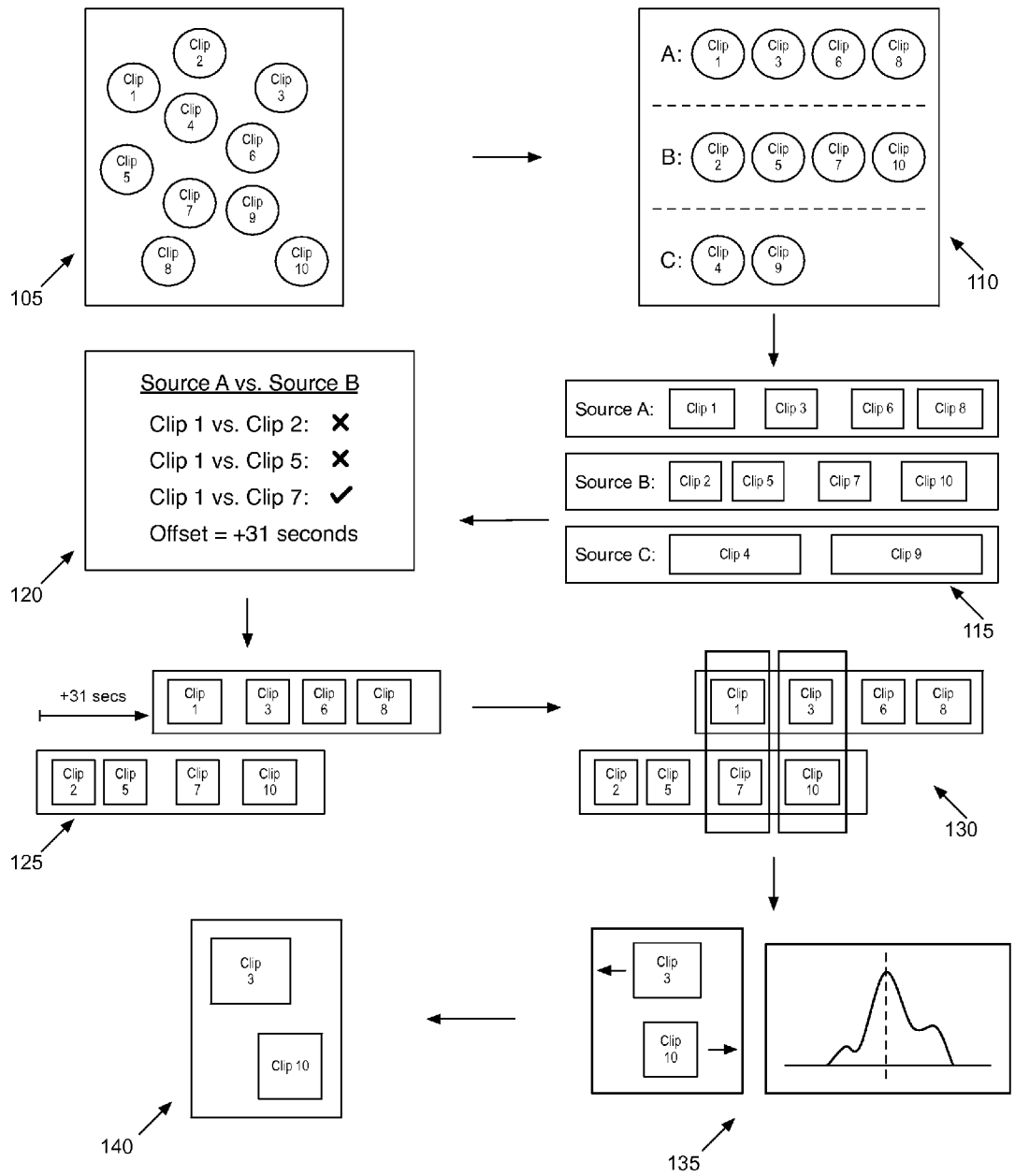
FIG. 1 conceptually illustrates an overview of the synchronization of media clips in some embodiments.

FIG. 1 conceptually illustrates an example of how media clips are synchronized in some embodiments. As shown, the automatic synchronization has six different stages. In this example, the first stage 105 shows ten media clips from several media recording devices that have been selected to be synchronized. At the second stage 110, media clips are arranged according to source. In this stage, the media recording source of each media clip is determined, and each media clip is sorted into groups according to source. The media recording source is determined by analyzing the recorder identifying data that is stored on the media clips as metadata. In some embodiments, the recorder identifying data includes a serial number of the video media recording device.

In this example, media clips from a first source A are sorted into a first group corresponding to source A, media clips from source B are sorted into a group corresponding to source B, and media clips from source C are sorted into a group corresponding to source C. In some embodiments, the groups into which the media clips are stored are electronic folders or bins of a computing device.

The third stage 115 shows the media clip for each source are arranged according to temporal data. The media clips are arranged based on time code information in some embodiments. Time code information is time data provided by an internal clock of a media recording device that is recorded onto the media clip during recording. Time code information represents time and date of the audio media clip recording as indicated on the clock of the media recording device. In some embodiments, the media clips are arranged according to file creation time information. File creation time information is a time stamp of the start time and/or date of the media clip recording according to the internal clock of the media recording device. The media clips for each source are placed in chronological order in accordance to the available temporal data. The media clips are placed in a sequence with proper offset from each other. That is, the spacing between each media clip of the sequence represents an actual elapsed time between the stoppage of the recording of one clip and the start of the recording of a next clip for that source.

The fourth stage 120 illustrates determining the time offset between two sequences by identifying and analyzing media clips from each sequence that match one another. The audio signal from a selected media clip of the first sequence is compared to the audio signal from several media clips of the second sequence to find a first match that satisfies a threshold value. In some embodiments, the comparison is accomplished by phase correlating the audio signals from the two clips to produce a correlation function. The correlation function provides the probability of match between the two media clips for all time offsets. Accordingly, the peak value of the correlation function corresponds to the time offset that produces the best match between the two clips.

In some embodiments, the peak value is compared against a predetermined threshold value. The threshold value, which is described in further detail by reference to FIG. 15 below, represents a minimum probability required to produce a satisfactory match and is used to filter out false matches. Thus, when the peak value fails to satisfy the threshold value, the two media clips are determined as not matching and a next media clip of the first sequence is compared to the several media clips of the second sequence.

Once a peak value is determined as satisfying the threshold value, no further comparisons are made in some embodiments and the time offset corresponding to that peak value is determined to be the time offset. The time offset represents the difference in actual time between the start of a first sequence and the start of a second sequence when recording the same event. In other words, the time offset, when applied to the first sequence, aligns the first sequence to be in time sync with the second sequence. The details of how time offset is determined will be provided by reference to FIGS. 10 and 11 below.

The fourth stage 120 conceptually illustrates that Clip 1 of source A matches Clip 7 of source B, and that the time offset between the sequences is determined to be +31 seconds. Accordingly, the sequence of source A is offset by +31 seconds. Specifically, the sequence of source A is delayed 31 seconds in relation to the sequence of source B. This delay represents a shift in time between the two clips. The shift in time synchronizes the events recorded on the sequence of source A to events recorded on the sequence of source B, as illustrated in the fifth stage 125.

Once the media clips from the two sequences are properly aligned, overlapping media clips are identified in the sixth stage 130. Overlapping media clips are those pairs of media clips that record the same event during an overlapping time period. For example, after the +31 seconds time offset is applied, Clip 1 from the first sequence and Clip 7 from the second sequence are shown to be overlapping since Clip 1 is recorded during a time period that overlaps with that of Clip 7. Clip 3 of the first sequence and Clip 10 of the second sequence are also identified as overlapping clips for the same reason.

While the fifth stage 125 shows the sequence of source A and the sequence of source B to be aligned after the time offset is applied, this alignment may not be precise for all the overlapping media clips identified in the sixth stage 130 for a variety of reasons (e.g. different clocks used by different media recording devices). Accordingly, the seventh stage 135 illustrates the fine-tuning of the overlapping media clips. Fine-tuning media clips is accomplished by cross correlating a pair of overlapping media clips to produce a correlation function. As described above, the resulting correlation function indicates the likelihood of match for all time offset. Accordingly, the peak value of the correlation function corresponds to a time offset that produces the best alignment of the overlapping media clips. The eighth stage 140 illustrates an alignment of Clip 3 and Clip 10 that is a result of applying a time offset that corresponds to the identified peak value of the correlation function.

Figure 2:
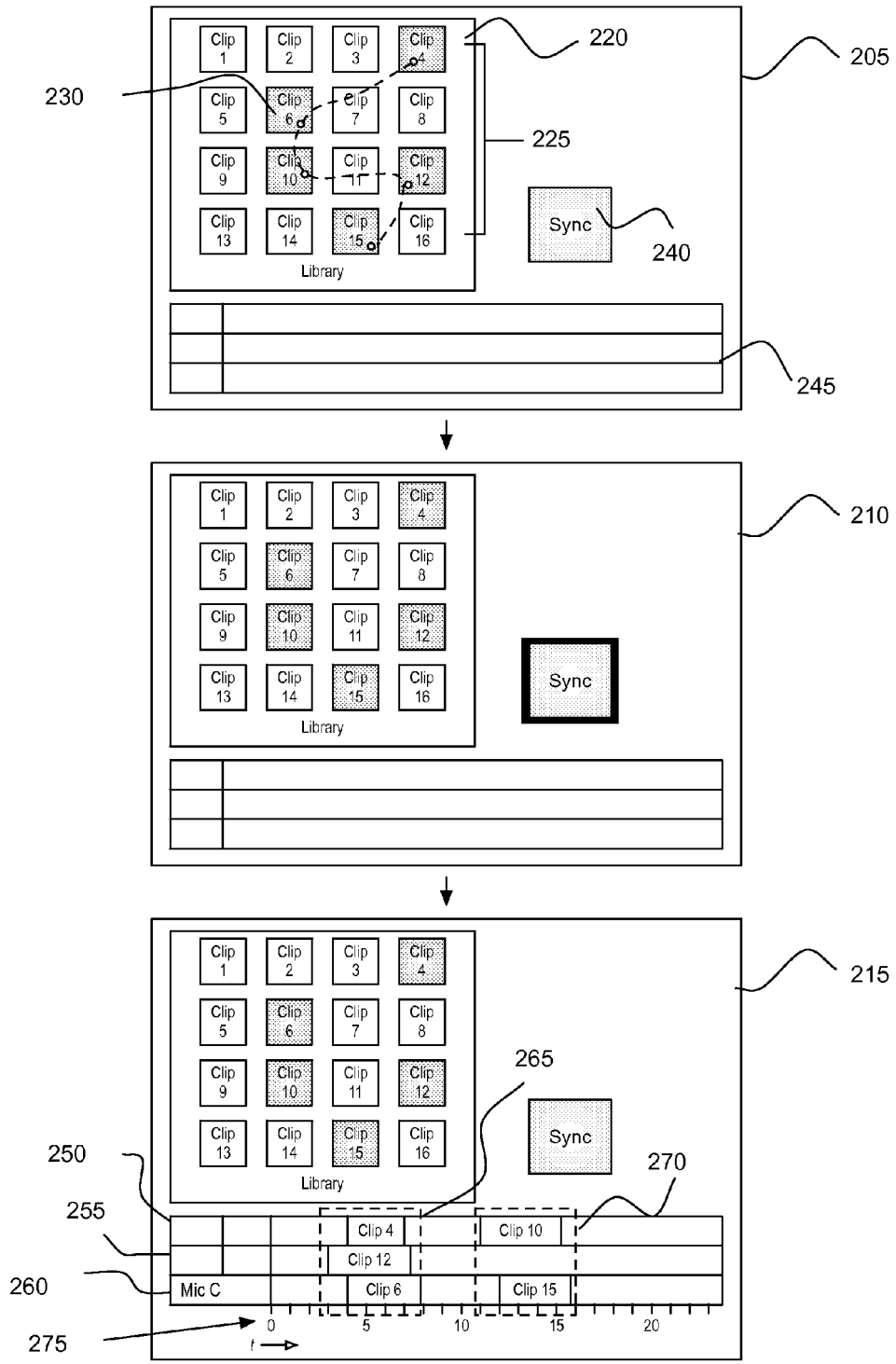
FIG. 2 conceptually illustrates auto synchronization of media clips selected from a media library display area of clips in some embodiments.

FIG. 2 conceptually illustrates a graphical user interface ("GUI") of a media-editing application in some embodiments. Specifically, FIG. 2 illustrates the GUI at three different stages of the auto synchronization process. The GUI of the media-editing application includes a media library display area 220 for displaying several media clips 225, a Sync button 240 for initiating the synchronization process, and a media display area 245 for displaying the media clips after they have been synchronized.

At the first stage 205, the media clips 225 are displayed in a media library display area 220 from which a user makes selections. The user selects media clips from the media library display area by pressing the symbol representing the media clip the user wishes to select. The user deselects a clip in the same fashion. The selection is received through a user selection input such as input received from a cursor controller (e.g., a mouse, touchpad, trackpad, etc.), from a touchscreen (e.g., a user touching a UI item on a touchscreen), from keyboard input (e.g., a hotkey or key sequence), etc. The term user selection input is used throughout this specification to refer to at least one of the preceding ways of making a selection or pressing a button through a user interface. In some embodiments, the user selects at least two media clips from the media library display area 220 of clips to be synchronized. These media clips include video media clips and/or audio media clips. The media clips are recorded by a variety of different media recording devices. The media clips are also recordings of various durations. Media clips that are selected from the media library display area 220 are highlighted (i.e. media clip 230) and remain highlighted unless the clip is deselected.

After the user makes a selection of media clips to synchronize, the user presses the Sync button 240 at a second stage 210 to initiate the synchronization process of the selected media clips. The synchronization process is discussed in detail with regards to FIG. 5 below.

The third stage 215 illustrates the results of the synchronization of the media clips. The groups of overlapping media clips from the three different sources 250, 255, and 260 are shown to be synchronized to one another. Additionally, a common timeline 275 is created in the media display area 245 to more precisely illustrate the alignment of the clips. The groups of overlapping media clips are also arranged in the media display area according to media recording device. For instance, the top set of media clips corresponds to Camera A 250, the middle set of media clips corresponds to Camera B 255, and the bottom set of media clips corresponds to Microphone C 260. In some embodiments, overlapping clips from different sources are grouped into multi-clips 265 and 270. Multi-clips are media structures that include multiple overlapping media clips that are aligned on a common timeline. While this example only specifies media clips from three media recording devices, the auto synchronization is capable of possessing media clips from several media recording devices.

The first multi-clip 265 includes Clip 4 from Camera A, Clip 12 from camera B, and Clip 6 from Microphone C. The three overlapping clips are aligned with one another by the auto synchronization process. Specifically, the three media clips correspond to recordings of the same event and are aligned such that the three media clips will produce synchronized video and audio outputs when played back together. In this example, Clip 12 is positioned to represent a recording from Camera B that started at t=3 of the common timeline 275. Additionally, Clip 4 of Camera A and Clip 6 of Microphone C are both positioned to represent a recording that started recording at t=4 of the common timeline 275. Thus Clip 12 is aligned on the common timeline 275 to be one time unit ahead of Clips 4 and 6. As a result, when the three aligned clips are played back together, the three clips play back the same time of the same recorded event.

The second multi-clip 270 includes Clip 10 from Camera A and Clip 15 from Microphone C. The second multi-clip 270 represents media clips recorded at a later time than the first multi-clip 265. The two overlapping clips of the second multi-clip 270 are also aligned with each other by the auto synchronization process. Specifically, the two media clips correspond to recordings of the same event and are aligned such that both clips will produce synchronized video and audio outputs when played back together. In this example, Clip 10 is positioned to represent a recording from Camera A that started at t=11 of the common timeline 275, and Clip 15 of Microphone C is positioned to represent a recording started at t=12. Thus Clip 11 is aligned on the common timeline 275 one time unit ahead of Clip 15. As a result, when the two aligned clips are played back together, the two clips play back the same time of the same recorded event. Such alignment of overlapping clips from multiple media recording devices into multi-clips provides the user the ability to synchronously view and edit media clips that have recorded the same event.

II. Media Content Synchronizer

Figure 3:
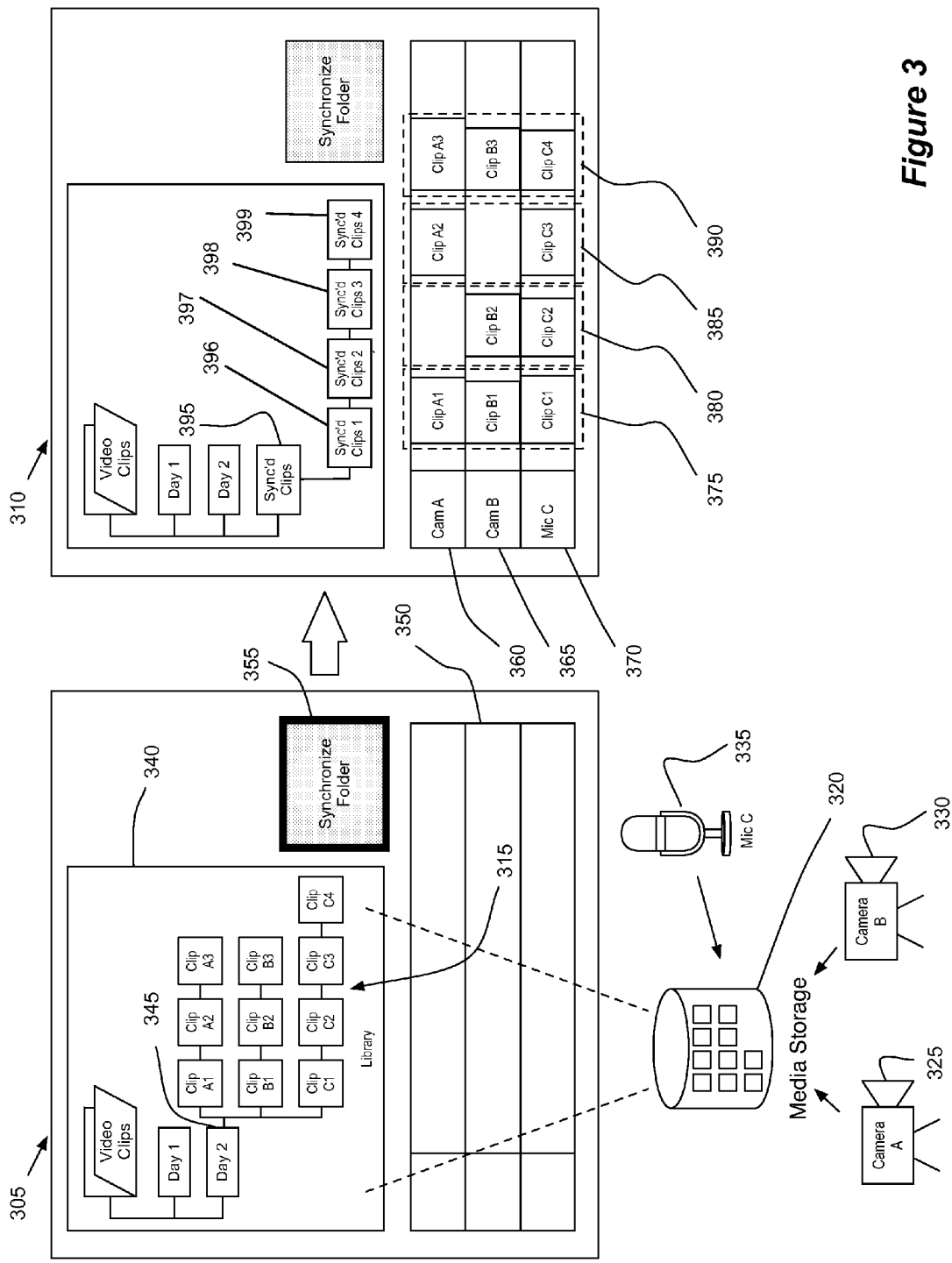
FIG. 3 conceptually illustrates synchronization of a folder of media clips in some embodiments.

FIG. 3 conceptually illustrates a GUI of a media editing application in some embodiments. Specifically, FIG. 3 illustrates the GUI at two different stages of the folder synchronization process. The GUI includes a media library display area 340 that includes a folder 345 containing media clips 315, a Synchronize Folder button 355 for initiating the synchronization process, and a media display area 350 for displaying the media clips when the synchronized media clips are selected from the folder. The GUI imports the media clips from a media storage device 320, which contains media clips recorded by Camera A 325, Camera B, 330, and Microphone C 335. The folder synchronization process performs synchronization on all media clips included in the folder 345 in the same fashion that the selected media clips were shown to be synchronized in FIG. 2. The folder 345 represents media clips that were recorded during a predetermined time period (i.e. a day, week, etc.).

At the first stage 305, the media clips 315 stored on a media storage device 320 are imported into a media library display area 340. Prior to being imported into the media library display area 340, the media clips are stored onto the media storage device 320 by media recording devices. Media recording devices include video recording devices and audio recording devices. As illustrated in FIG. 3, the video media clips are produced by Camera A 325, Camera B 330, and the audio media clips are produced by Microphone C 335. The media clips are digital representation of images and sounds recorded by the media recording devices.

In some embodiments, the media clips 315 are sorted into folders according to the time at which each of the media clips was recorded. The timeframe for which clips are sorted in each folder vary depending on the user's preferences. For example, each folder may represent 12 hours' worth or a week's worth of media clips. FIG. 3 illustrates the folder 345 comprising a day's worth of media clips. The user initiates the synchronization process by pressing the Synchronize Folder button 355. As described above, the selection is received through a user selection input such as input received from a cursor controller (e.g., a mouse, touchpad, trackpad, etc.), from a touchscreen (e.g., a user touching a UI item on a touchscreen), from keyboard input (e.g., a hotkey or key sequence), etc.

The second stage 310 illustrates the results of the synchronization of the media clips 315 in a media display area 350. The second stage 310 also shows the results of the synchronization as multi-clips arranged in a separate folder under the Sync'd Clips folder 395. The Sync'd Clips folder in this example includes a Sync'd Clips 1 folder 396, a Sync'd Clips 2 folder 397, a Sync'd Clips 3 folder 398, and a Sync'd Clips 4 folder 399. Each of the separate folders represents a multi-clip of time-coincident media clips.

When a user selects the folders to be expanded, the synchronized media clip components of each of the multi-clips are displayed in the media display area 350. In this example, the first multi-clip 375 represents the Sync'd Clips 1 folder and includes Clip A1 from Camera A, Clip B1 from camera B, and Clip C1 from Microphone C. The second multi-clip 380 represents the Sync'd Clips 2 folder and includes Clip B2 from camera B and Clip C2 from Microphone C. The third multi-clip 385 represents the Sync'd Clips 3 folder and includes Clip A2 from camera A and Clip C3 from Microphone C. The fourth multi-clip 390 represents the Sync'd Clips 4 folder and includes Clip A3 from Camera A, Clip B3 from camera B, and Clip C4 from Microphone C. Each of the four multi-clips represents two or more overlapping clips that are aligned with one another by the synchronization process. Specifically, the overlapping clips correspond to recordings of the same event and are aligned such that the clips will produce synchronized video and audio outputs during playback. The clips are aligned such that when the clips are played back together, the clips play back the same recorded event.

The media display area 350 of the second stage 310 also shows the media clips arranged by recording device and in chronological order. The second stage 310 further shows overlapping clips from three different media recording devices that are aligned with one another. In this example, the top set of media clips corresponds to Camera A 360, the middle set of media clips corresponds to Camera B 365, and the bottom set of media clips corresponds to Microphone C 370. While this example only specifies media clips from three media recording devices, the synchronization of folders is capable of processing media clips from several media recording devices.

III. Media Clips Structure

Figure 4:
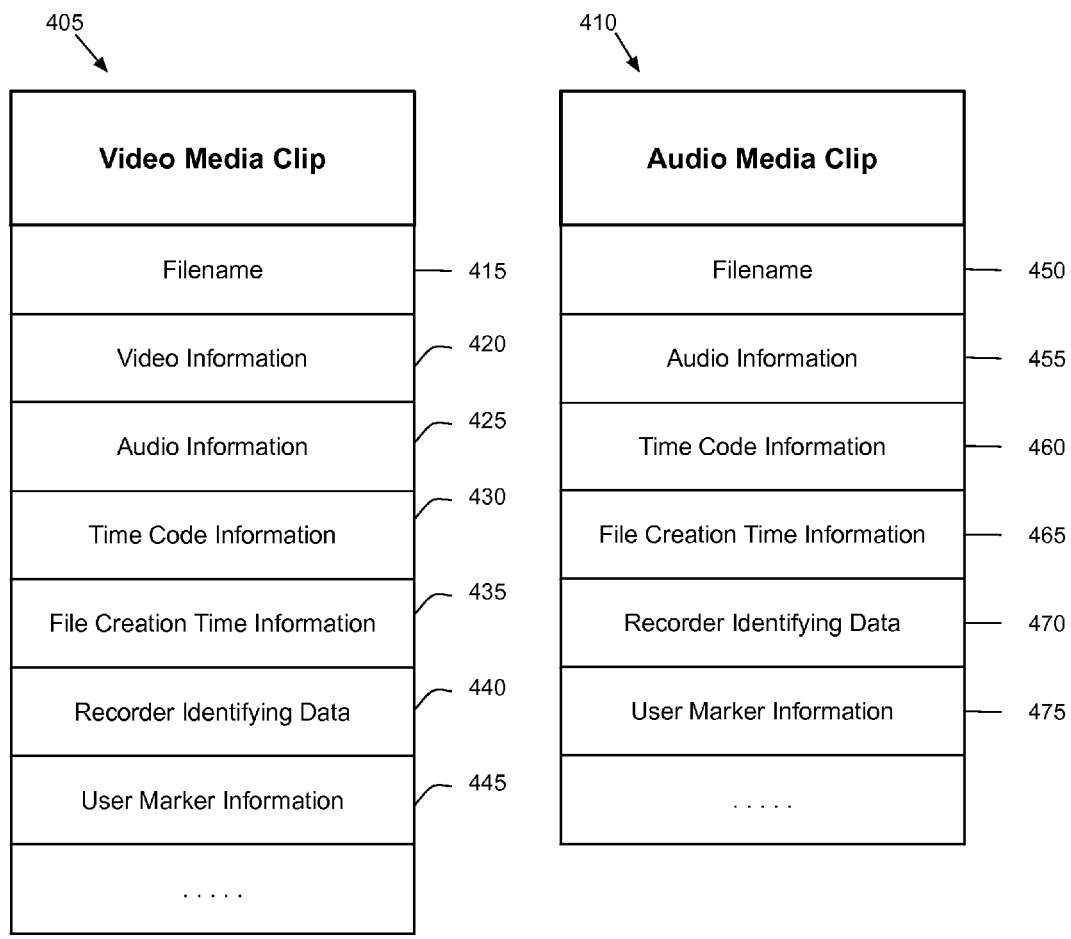
FIG. 4 conceptually illustrates metadata components of video media clips and audio media clips in some embodiments.

FIG. 4 conceptually illustrates examples of media clips processed by the synchronization process in some embodiments. The video media clip 405 includes filename information 415. The filename information 415 includes alpha-numeric and symbol characters. In some embodiments, the filename information is automatically created by a video media recording device at the time of the recording. The filename information created by the video media recording device in some embodiments is created in sequential (e.g. numerical or alphabetical) order. The filename information is input or edited by a user through an input device in some embodiments.

The video media clip also includes video information 420. The video information represents the series of image data that are captured by the video media recording device and used to produce a video. In addition to the video information, the video media clip in some embodiments includes audio information 425 that corresponds to the video information. Audio information of the video media clip is recorded by an on-board audio recorder of the video media recording device. Since both the audio information and the video information are recorded by the same video media recording device, the audio and video information are in sync with one another when recorded. In other words, the audio information corresponds to the video information recorded by the video media recording device. Accordingly, the audio information provides a baseline to which other audio information is compared and synchronized.

In some embodiments, the video media clip includes time code information 430. Time code information is provided by an internal clock of the video media recording device and is recorded onto the video media clip when the video media recording device records an event. In some embodiments, time code information is an actual time and date of the video media clip recording. The time code corresponds to the recorded audio and video information.

In some embodiments, the video media clip includes file creation time information 435. The file creation time information is provided by the internal clock of the video media recording device as a stamp of the start time and/or date that the video media clip was created. Since the file creation time information provides a temporal snapshot, the information is only recorded once per video media clip. Furthermore, no two media clips from the same video media recording device can have identical file creation time information.

In some embodiments, the video media clip includes recorder identifying data 440. The recorder identifying data is unique to each video media recording device (e.g. the data includes a serial number of the video media recording device). In some embodiments, the recorder identifying data is input or edited by a user to identify the video media recording device. The recorder identifying data is provided on the video media clip to indicate the source of the particular clip. Identification of the source of a video media clip expedites the audio synchronization process by providing a data reduction metric.

In some embodiments, the video media clip includes user marker information 445. User marker information is information input by a user to indicate a location on the video media clip for which the user would like to mark. Generally, the user marker corresponds to a specific frame of the video information. In some embodiments, the user marker corresponds to a particular location on the audio information or the actual or elapsed time of the video media clip. The user marker information is utilized to expedite the audio synchronization process by providing a starting point from which to start a synchronization analysis.

In some embodiments, the media clip is an audio media clip 410. The audio media clip includes audio information 455 which is a digital representation of sound recorded from a microphone of an audio recorder. The audio media clip also includes filename information 450, time code information 460, file creation time information 465, recorder identifying data 470 and user marker information 475 similar to the corresponding information included in the video media clips. In some embodiments, the filename information, time code information, file creation time information, recorder identifying data and user marker information are included in the video and audio media clips as metadata.

IV. Auto Synchronization

Figure 5:
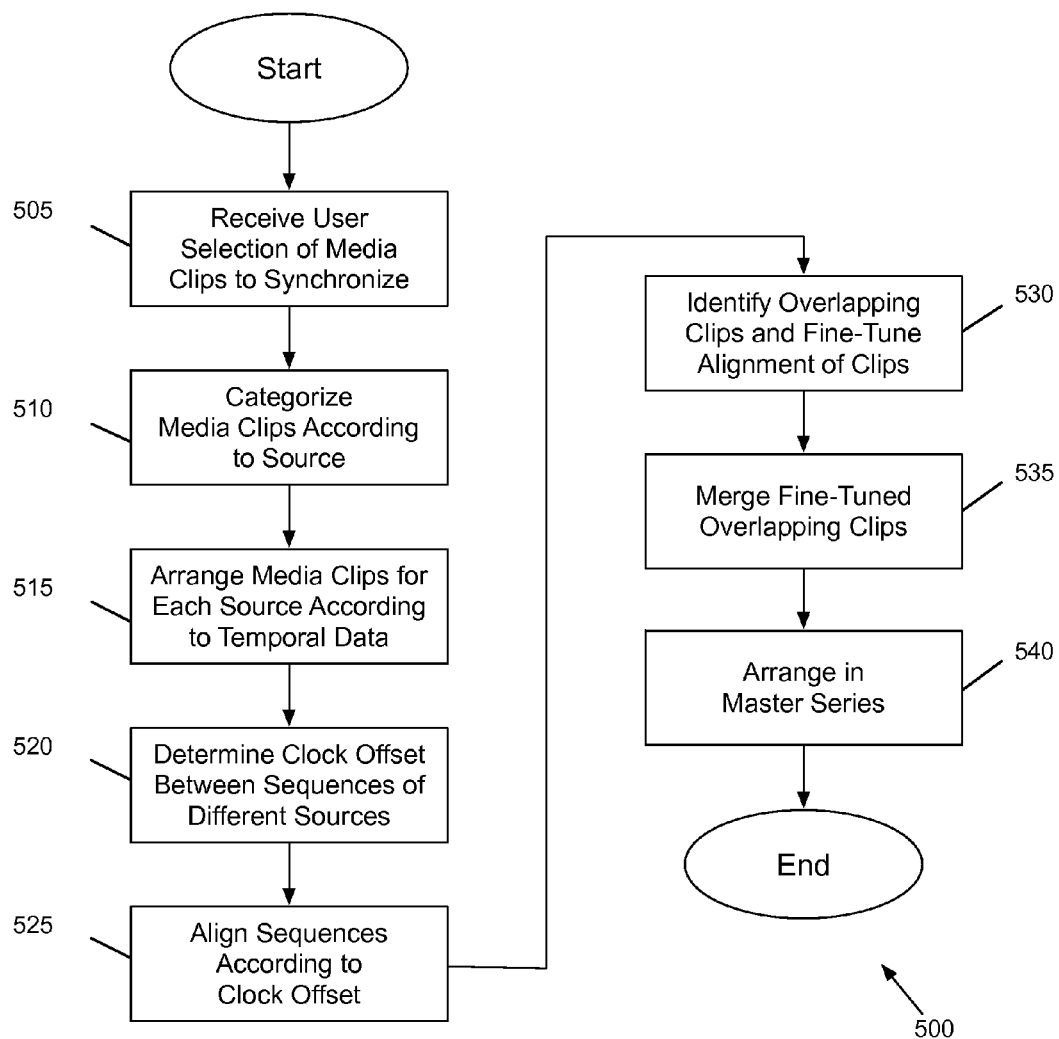
FIG. 5 conceptually illustrates a process for performing the audio synchronization in some embodiments.

FIG. 5 conceptually illustrates a process 500 for synchronizing several media clips including video media clips and audio media clips selected by a user from a media library display area of media clips in some embodiments. As shown, process 500 receives (at 505) a user selection of media clips to synchronize. As noted above, the user selects at least two media clips from the media library display area of clips to be synchronized. Next, the process categorizes (at 510) media clips according to source. The process determines the media recording source of each media clip by analyzing the recorder identifying data. Process 500 then sorts each media clip into groups according to the source. Specifically, media clips from a first source are sorted into a group corresponding to the first source, media clips from a second source are sorted into a group corresponding to the second source, etc.

The process then arranges (at 515) each of the media clips for each source group according to temporal data. The temporal data according to which the media clips are arranged is time code information or file creation time information in some embodiments. The media clips for each source are placed in chronological order in accordance to the temporal data of each media clip. The process also arranges the media clips in a sequence with proper offset from each other. That is, the spacing between each media clip of the sequence represents an actual elapsed time between the stoppage of the recording of one clip and the start of the recording of a next clip. The process arranges the media clips in such a sequence for each of the several source groups.

Next, process 500 determines (at 520) time offset between sequences of different sources. The time offset represent the difference in actual elapsed time between the start of a first sequence and the start of a second sequence, the first sequence being from a first source group and the second sequence from a second source group. In other words, the time offset is applied to the sequence of the first source in order to align it with a sequence of the second source so that the media clips of each sequence are roughly synchronized in time. As described in further details below by reference to FIGS. 10 and 11, the process of determining the time offset is an iterative process. For example, the process compares media clips from a first source to media clips from a second source until a certain criteria for the comparison has been satisfied.

After determining the time offsets, process 500 aligns (at 525) the sequences of each of the source groups according to the determined time offsets. The process applies the respective time offsets to shift each sequence into alignment with one another. The alignment of the two sequences provides a hint as to how the media clips from each sequence align with one another. As described above, when two sequences are aligned, the media clips of each sequence are roughly synchronized in time.

Once the sequences are aligned according to time offsets, process 500 identifies (at 530) the media clips from each sequence that overlap with one another on a common timeline. Overlapping clips are identified by process 500 as clips from two separate sequences (i.e. two different media recording devices) that record the same event at the same time. For instance, a video camera and a microphone that concurrently record the same event will produce overlapping clips. After the overlapping clips are identified, process 500 fine-tunes the overlapping clips by making minor adjustments to the alignment of the clips. The process by which the clips are fine-tuned is described in more detail by reference to FIG. 14 below.

Next, the process merges (at 535) each set of overlapping clips that has been fine-tuned into a single multi-clip. In some embodiments, each multi-clip includes at least two clips, where each clip is from a different sequence. Additional clips of the multi-clip must also originate from different sequences. In other words, each clip of a multi-clip must be from a unique sequence (i.e. unique media recording device) since a single media recording device cannot record two different clips at the same time.

After the overlapping clips are merged into several multi-clips, the process arranges (at 540) the merged clips into a master series. The process then exits. The master series includes a series of multi-clips where each multi-clip represents two or more overlapping recordings that are synchronized with one another. In some embodiments, the multi-clips are arranged in chronological order separated by a user specified time duration. For example, a user specifies a five second pause in between each multi-clip. Accordingly, a five second pause is inserted between each multi-clip on the master series. Once the multi-clips are arranged, the master series of all the synchronized clips is available to be viewed by users.

V. Sorting Media Clips by Source

Figure 6:
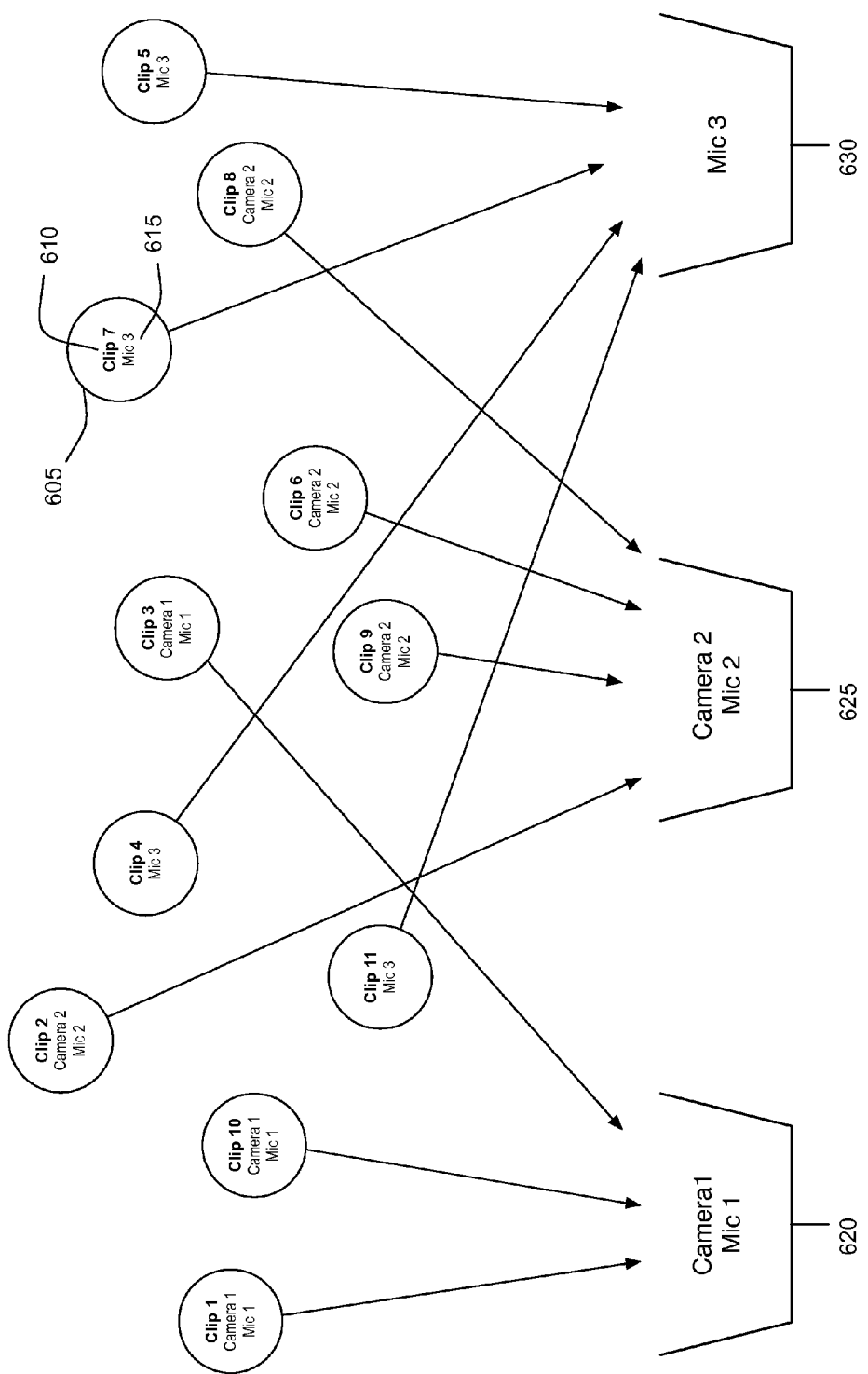
FIG. 6 conceptually illustrates sorting media clips into respective source groups in some embodiments.

Categorization of media clips according to media recording sources in some embodiments is described by reference to FIGS. 6 and 7. FIG. 6 conceptually illustrates sorting media clips into respective source groups in some embodiments. As shown in FIG. 6, media clip 605 includes filename information 610 and recorder identifying data 615. As described above, the filename information includes alpha-numeric and symbol characters that are automatically created by a media recording device at the time of the recording. Furthermore, the recorder identifying data in some embodiments includes a serial number of the media recording device. In some embodiments, the recorder identifying data is input by the user. The recorder identifying data is provided on the media clip to uniquely identify the source of the particular clip. Identification of the source of a media clip expedites the audio synchronization process. For instance, two media clips recorded by the same media recording device cannot overlap with one another since a single media recording device cannot record two clips at the same time. Thus, sorting media clips according to source ensures that two media clips from the same source will not be compared and synchronized with one another.

FIG. 6 illustrates Clip 1 as including recorder identifying data that identifies the source of the clip as Camera 1/Mic 1. Accordingly, Clip 1 is sorted into the group designated as Camera 1/Mic 1. The remaining clips (e.g. Clips 2-11) are similarly sorted into their respective groups (Camera 1/Mic 1, Camera 2/Mic 2, and Mic 3) according to recorder identifying data. Specifically, Clips 1, 3, and 10 are placed into the Camera 1/Mic 1 group 620; Clips 2, 6, 8, and 9 are placed in the Camera 2/Mic 2 group 625; and Clips 4, 5, 7, and 11 are placed in the Mic 3 group 630. While FIG. 6 includes groups for three separate sources, some embodiments include groups for several additional sources.

Figure 7:
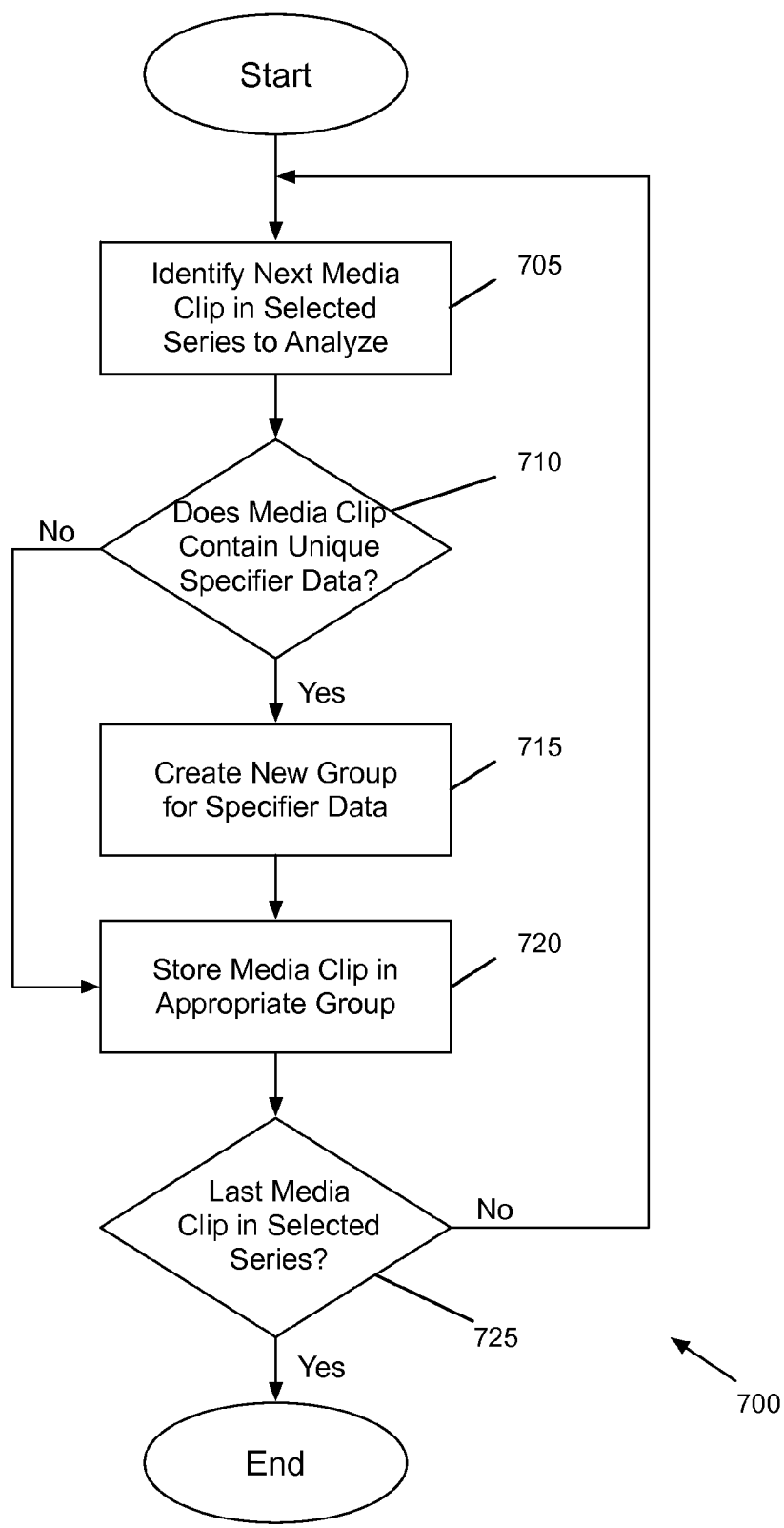
FIG. 7 conceptually illustrates a process for sorting media clips into source groups in some embodiments.

FIG. 7 conceptually illustrates a process 700 for sorting the several media clips including video media clips and audio media clips. Process 700 first identifies (at 705) a next media clip to be analyzed. After a media clip is identified, the process determines (at 710) whether the identified media clip contains unique recorder identifying data. When recorder identifying data for the clip is unique, a new group is created (at 715) and the media clip is stored into the newly created group (at 720). However, when the recorder identifying data is not unique, process 700 simply stores (at 720) the media clip into the appropriate group that corresponds to the recorder identifying data.

As illustrated in FIG. 6, Clip 1 includes recorder identifying data that identifies the source of the clip as Camera 1/Mic 1. When a group for Camera 1/Mic 1 exists, Clip 1 is stored into that group. However, when a group for Camera 1/Mic 1 does not exist, then a group is created and the clip is stored into the newly created group. Furthermore, all subsequently analyzed clips with recorder identifying data that identifies the source of the clip as Camera 1/Mic 1 will be stored in the Camera 1/Mic 1 group.

After each clip is analyzed, process 700 determines (at 725) whether that particular media clip is the last in a selected series. When the particular media clip is not the last in a selected series, process 700 proceeds to 705 and identifies a next media clip to be analyzed. The process sorts each clip until all of the media clips in the selected series has been processed. When the particular media clip is the last in a selected series, the process exits.

VI. Arranging Media Clips into Chronological Order

Figure 8:
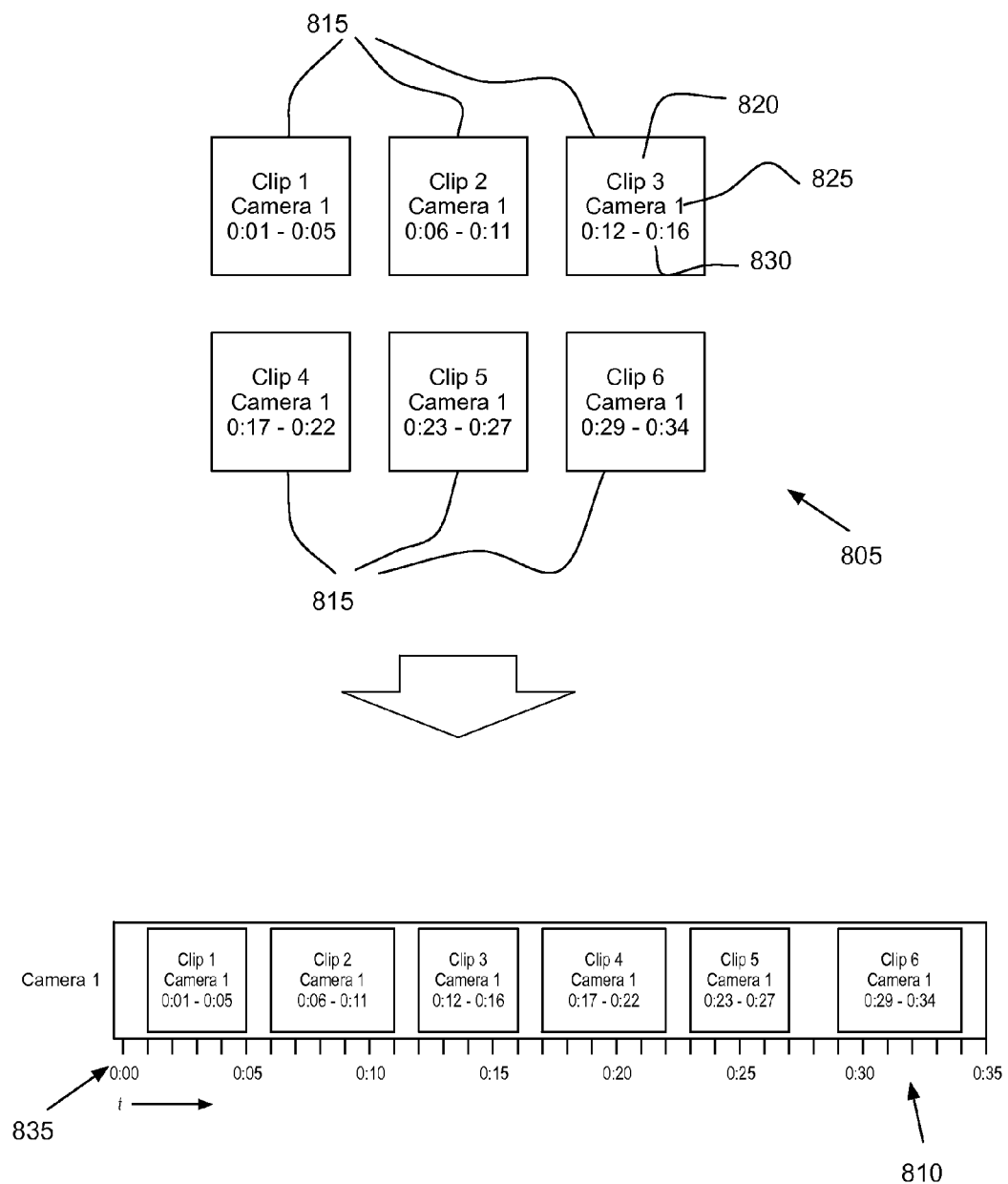
FIG. 8 conceptually illustrates arranging media clips by time code data in some embodiments.

After the media clips are sorted into their respective groups, the media clips from each group are arranged into a sequence. FIG. 8 conceptually illustrates media clips from a source group being arranged into a sequence according to time code data in some embodiments. Specifically, FIG. 8 illustrates the organization of media clips in two different stages. As shown in FIG. 8, each clip 815 includes a filename 820, recorder identifying data 825, and time code information 830.

At the first stage 805, the media clips 815 are arranged by filename 820. In some embodiments, the user specifies how the media clips are arranged. For example, the user chooses to have the media clips arranged by filename, file creation time, file type, etc. In some embodiments, the user chooses to arrange the media clips in alpha-numeric order, or reverse alpha-numeric order.

As illustrated in the figure, the media clips in the first stage 805 are from a single source (Camera 1 in this case), as indicated by the recorder identifying data 825. Each media clip also contains temporal data 830. In some embodiments, the temporal data included in each media clip is the time of the recording in accordance to a clock on Camera 1. When Camera 1 records an event, the time from Camera 1 is recorded onto the media clip as temporal data along with the video and/or audio information. The duration of each media clip also varies in length depending on the recording, as illustrated by the different elapsed times of the temporal data 830 of the different media clips. The amount of time that elapses between the recordings of two media clips also varies. In FIG. 8, Clip 1 is shown to have been recorded from t=0:01-0:05, and Clip 2 is shown to have been recorded from t=0:06-0:11. Thus, a 0:01 unit of time elapsed between the end of Clip 1 and the beginning of Clip 2. FIG. 8 also shows that the recording of Clip 5 ends at t=0:27 and the recording of Clip 6 begins at t=0:29. Thus, 0:02 units of time elapsed between the recording of the two media clips.

At the second stage 810, the media clips are arranged into a sequence according to temporal data. Since all the media clips from the source group were produced by a common source (Camera 1), the temporal data of the media clips reference the same clock. Accordingly, the timeline 835 represents the time from the clock on Camera 1 at the time of each respective recording. Each of the media clips is arranged on the timeline in chronological order. Each of the media clips is also properly offset from each other. That is, the spacing between each media clip of the sequence represents an actual elapsed time between the stoppage of the recording of one media clip and the start of the recording of a next media clip. As illustrated in the figure, Clip 1 begins at 0:01 and ends at 0:05 on the timeline 835; Clip 2 begins at 0:06 and ends at 0:11; Clip 3 begins at 0:12 and ends at 0:16; Clip 4 begins at 0:17 and ends at 0:22; Clip 5 begins at 0:23 and ends at 0:27; and Clip 6 begins at 0:29 and ends at 0:34. The figure further shows that a 0:01 gap between each of the first 5 media clips, and a 0:02 gap between Clip 5 and Clip 6.

FIG. 9 conceptually illustrates arranging media clips from a source group into a sequence according to file creation time information in some embodiments. Specifically, FIG. 9 illustrates the organization of media clips in two different stages. As shown in FIG. 9, each clip 915 includes a filename 920, recorder identifying data 925, and file creation time information 930.

At the first stage 905, the media clips 915 are arranged by filename 920. As describe above with regards to FIG. 8, in some embodiments, the user specifies how the media clips are arranged. For example, the user chooses to have the media clips arranged by filename, file creation time, file type, etc. In some embodiments, the user chooses to arrange the media clips in alpha-numeric order, or reverse alpha-numeric order.

As shown in the figure, the media clips in the first stage 905 are from a single source (Camera 1 in this case), as indicated by the recorder identifying data 925. Each media clip contains temporal data 930. In some embodiments, the temporal data included in each media clip is the file creation time of the media clip. When a media recording device captures an event, a time stamp corresponding to the time when the media clip is created is appended to the media clip as temporal data along with the video and/or audio information. The time stamp appended to the media clip is derived from the clock of Camera 1.

At the second stage 910, the media clips are arranged in a sequence according to file creation time. All the media clips from the source group were produced by a common source (Camera 1). Thus the temporal data of the media clips reference the same clock. Accordingly, the timeline 935 represents the time from the clock on Camera 1 at the time the recordings were made. Each of the media clips is arranged on the timeline in chronological order according to file creation time. Since all the media clips of the sequence originate from the same media recording device, none of the clips will overlap on the timeline. That is, a media recording device cannot record two events at the same time. As illustrated in the figure, Clip 1 was created at 1:01; Clip 2 was created at 1:07; Clip 3 was created at 1:13; Clip 4 was created at 1:19; Clip 5 was created at 1:24; and Clip 6 was created at 1:30. While the figure shows that Clips 1-6 are all of the same duration, the duration of each media clip varies in some embodiments.

VII. Determination and Application of Time Offset

Figure 10:
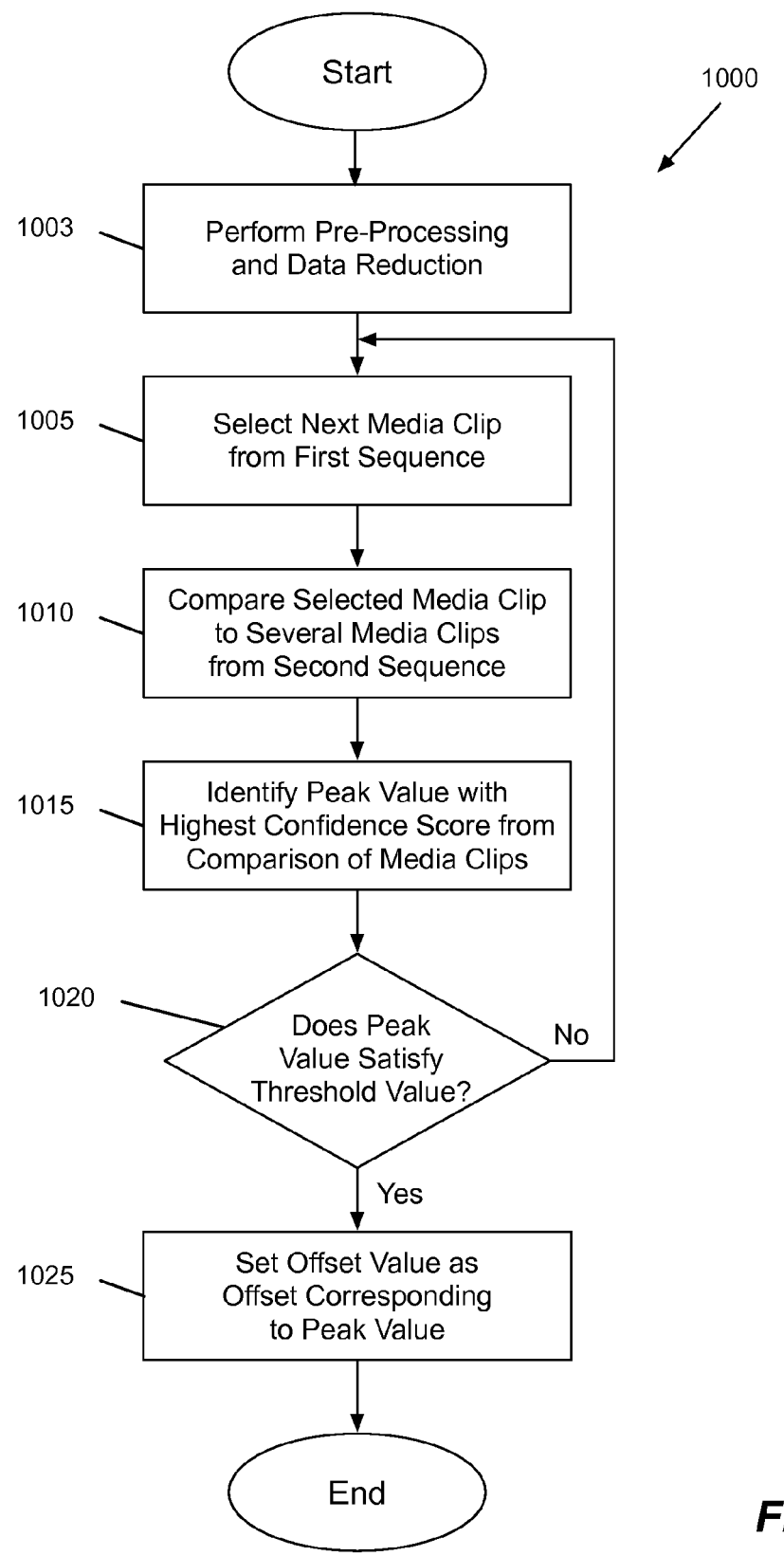
FIG. 10 conceptually illustrates a process of determining time offsets between two sequences of media clips in some embodiments.

When media clips of each source group are arranged in chronological order according to temporal data, some embodiments determine a time offset between the sequences in order to align the sequences with one another. FIG. 10 conceptually illustrates a process 1000 for determining a time offset between sequences of media clips in some embodiments.

In some embodiments, pre-processing and data reduction is performed (at 1003) in order to expedite the correlation processing of media clips. Pre-processing audio helps to enhance the matching process. For example, filtering out noise, applying equalization to target specific frequencies, applying normalization and/or dynamics processing to balance levels, etc., are all methods that can improve the results of the correlation.

Data reduction is performed to further facilitate the correlation process. In some embodiments, a sample rate reduction is performed. Sample rate reduction receives an audio signal occurring at a given sample rate and produces an output audio signal occurring at a lower sample rate, thus reducing the amount of data that needs to be processed. In some embodiments, silence windowing is used for data reduction. Silence windowing skips the silent sections, or reduces the quiet sections to silence in order to skip the insignificant sections of the audio signal, thus speeding up the mathematical calculation of the correlation function.

Additionally, in some embodiments the user picks clip subsections (i.e. inputs a user marker or likely alignment) to expedite the audio synchronization. The clip subsections chosen by the user provide a point from which the synchronization analysis is started. User marker information is information input by a user to flag a location on a media clip. The approximate location of where two or more audio clips are related provides a hint as to a likely alignment from where the correlation processing of the audio clips begins. Details of user marker analysis are provided by reference to FIG. 18 below.

After the pre-processing and data reduction is complete, process 1000 selects (at 1005) the next media clip from a first sequence. Next, the process compares (at 1010) the audio signal of the selected media clip from the first sequence to the audio signals of several media clips from a second sequence. For instance, Clip 1 of Camera 1 is compared to the first three clips of Camera 2 in the example shown in FIG. 11. In some embodiments, the number of media clips from the second sequence against which the selected media clip from the first sequence is compared is preset. In some embodiments, the number of clips from the second sequence to be compared against is determined by the user.

The comparison of two media clips in some embodiments is accomplished by phase correlating the audio signal included in the two media clips being compared. Performing a phase correlation of two audio signals produces a correlation function that indicates how likely the audio signals will match for every possible time offset between the two media clips. For example, when two media recorders record the same event but the second recorder starts recording five seconds after the first recorder starts, then the phase correlation function would indicate a high probability for a match between the two media clips for a time offset of five seconds. Phase correlation is discussed in further detail by reference to FIG. 18 below.

After the media clips are compared by phase correlation, the process identifies the peak value of each of the phase correlation functions produced from the comparisons between the media clip selected from the first sequence and several media clips from a second sequence. In some embodiments, the phase correlation function factors out the length of overlap such that the peak value isn't artificially large because of a larger number of overlapping samples.

The peak value of each correlation function is the most probable synchronization point for the two correlated audio clips. However, comparing the peak value of one correlation function to the peak value of a second correlation function may produce an inaccurate result. In order to produce a more accurate result, each peak value is multiplied by a median absolute deviation (MAD) of the correlation function in some embodiments.

For a univariate data set $X_1$, $X_2$, . . . , $X_n$, the median absolute value is calculated as:

$$MAD = median_i(|X_i - median_j(X_j)|).$$

Accordingly, the confidence equation is calculated as:

$$Confidence = PeakValue(f(x)) * MAD/Sensitivity,$$

where $f(x)$ is the phase correlation signal and Sensitivity is a tuning constant. Multiplying the peak value by the median absolute deviation calculates the deviation in a signal. The MAD is particularly useful because it is resilient to outliers (i.e. the result doesn't get thrown off by momentary corruption), while being comparable to the standard deviation. The greater the deviation in a signal, the higher the probability that the peak is significant. Thus, normalizing peak values from different correlation functions by the MAD provides a better basis for comparison. Peak values that are significantly higher than the absolute deviation score a higher confidence.

The peak value identified (at 1015) as having the highest confidence score corresponds to the most likely match among the comparison of media clips between the first and the second sequence. For instance, when the selected clip of the first sequence matches a second clip of the second sequence more accurately than a third clip of the second sequence, the normalized peak value of the correlation function between the selected clip and the second clip will be larger than that for the selected clip and the third clip. In some embodiments, the peak value corresponds to the time offset that produces the best alignment between the two media clips that are determined to be a match.

Once the peak value with the highest confidence score is identified, process 1000 determines (at 1020) whether the identified peak value satisfies a threshold value. The threshold value represents a minimum probability required to produce a satisfactory match. Peak values that do not satisfy the threshold value are indicative of unsatisfactory matches and are thus filtered out. The threshold value is a preset value. In some embodiments, the threshold value is user adjustable.

When the peak values is not higher than the threshold value, process 1000 proceeds to 1005 and selects the next media clip from the first sequence and performs the comparison with the first several media clips from the second sequence. In some embodiments, the media clip in the first sequence is compared only to a subset of clips in the second sequence and if a peak which satisfies the threshold is not found, the process proceeds to 1005 to select the next clip in the first sequence. This speeds up the process e.g., when the recording source for the second sequence was not on during the recording of the current media clip in the first sequence. In other embodiments, as long as a peak that satisfies the threshold is not found, all media clips in the second sequence are compared to the current media clip in the first sequence.

When the peak value is higher than the threshold value, a match is indicated and process 1000 sets (at 1025) the time offset value as the time offset corresponding to the peak value of the phase correlation function. The process then exits. The relationship between the correlation value and time offset is described below by reference to FIG. 15. In some embodiments, when all media clips from the first sequence have been compared to the several media clips from a second sequence and no satisfactory match is found, the process then compares the media clips from the first sequence to the remaining media clips of the second sequence until a satisfactory match is found. In some embodiments, when no satisfactory match is found, the process determines that the first sequence and the second sequence do not include any overlapping clips (e.g. all media clips from the first sequence were recorded at different times from all media clips from the second sequence) in some embodiments. In other embodiments, the threshold value is lowered to produce a satisfactory match. Lowering the threshold value effectively reduces the correlation value required for a satisfactory match.

Figure 11:
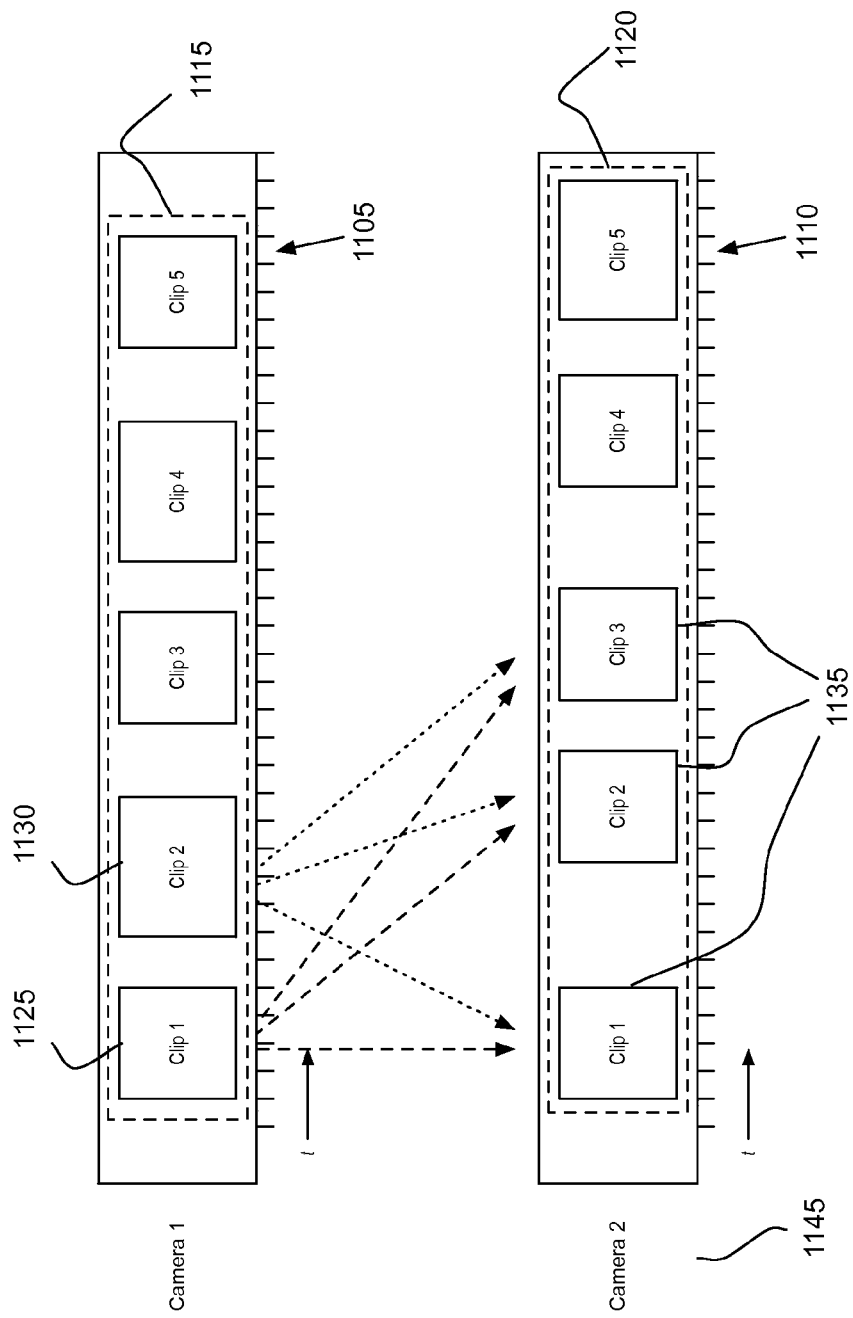
FIG. 11 conceptually illustrates comparing media clips of a first sequence to media clips of a second sequence in some embodiments.

FIG. 11 conceptually illustrates the comparison process described by reference to FIG. 10. As shown in FIG. 11, media clips 1115 of a first sequence 1105 are compared with media clips 1120 of a second sequence 1110 in some embodiments. The first sequence 1105 includes media clips 1115 from Camera 1 and the second sequence 1110 includes media clips 1120 from Camera 2. A first media clip 1125 from the first sequence 1105 is compared to several media clips 1135 from the second sequence 1110. The comparison of each pair of media clips is performed as a phase correlation.

Phase correlating the two audio signals produces a correlation function that indicates how likely the two audio signals match for every possible time offset between the two media clips. Each correlation function produced by the phase correlation includes a peak value that corresponds to the likelihood of a match between the two compared signals. In some embodiments, the peak value corresponds to the time offset that produces the best alignment between the two media clips being compared.

In order to produce a satisfactory match, a set of comparisons is required to produce a peak value that satisfies a threshold. The threshold value represents a minimum probability required to produce a good match. When the first set of comparisons does not provide a peak value that satisfies a threshold, a next (second) media clip 1130 from the first sequence is compared to several media clips 1135 from the second sequence. As described above, the comparison is accomplished by phase correlating each pair of media clips to obtain a correlation function indicating the likelihood of match for every possible time offset.

While FIG. 11 only illustrates the first two media clips of the first sequence being compared to several media clips of the second sequence, the process will continue to compare a next media clip from the first sequence to several media clips of the second sequence until a peak value satisfying the threshold is produced. A peak value that satisfies the threshold indicates a good match between the pair of clips being compared. When a good match is achieved, the process determines from the correlation function the time offset value that corresponds to the peak value.

Figure 12:
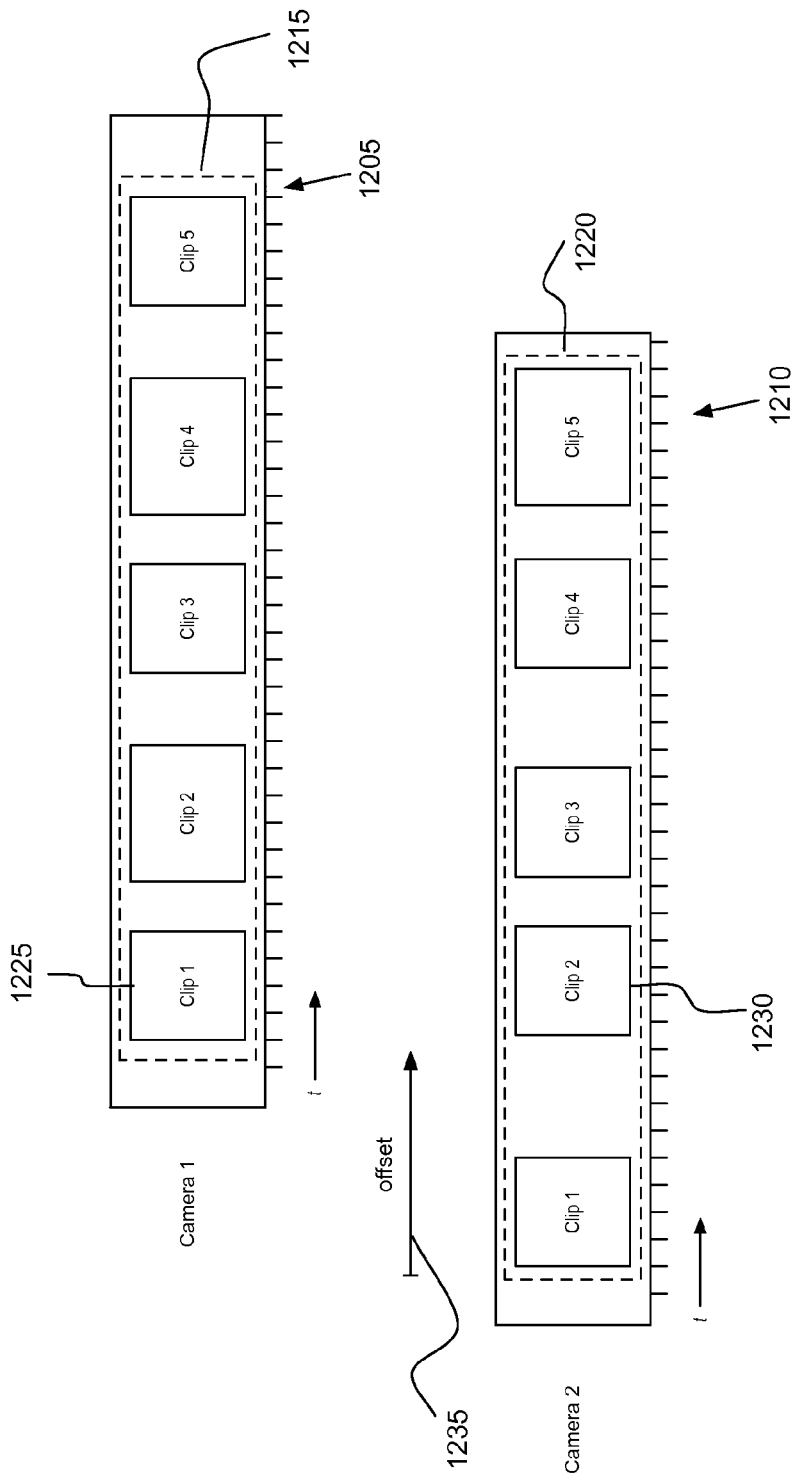
FIG. 12 conceptually illustrates applying a time offset to align a first sequence of media clips to a second sequence of media clips in some embodiments.

The determined time offset is applied to align the two sequences of media clips. FIG. 12 conceptually illustrates the application of a time offset 1235 to align the first sequence 1205 with the second sequence 1210 in some embodiments. The first sequence includes media clips 1215 from Camera 1 and the second sequence includes media clips 1220 from Camera 2. When the time offset is applied to the first sequence, Clip 1 1225 of the first sequence is shown to be aligned with Clip 2 1230 of the second sequence. This alignment indicates that a comparison of Clip 1 1225 of the first sequence with Clip 2 1230 of the second sequence produced a peak value that satisfies the threshold described in FIG. 11. That is, Clip 1 of the first sequence is determined to be a good match to Clip 2 of the second sequence. Consequently, the time offset determined from the correlation function aligns the first sequence and the second sequence as illustrated in this example.

As shown by the alignment performed in FIG. 12, the first sequence of media clips is offset by approximately nine time units from the second sequence of media clips. This time offset indicates that Camera 1 began recording Clip 1 approximately 9 time units after Camera 2 began recording its respective Clip 1. Since the time offset is applied to the entire first sequence, the time offset effectively shifts all media clips included in the first sequence by the designated number of time units. As a result of the applied time offset, Clip 1, Clip 2, Clip 3, and Clip 4 of the first sequence are shown to be aligned with Clip 2, Clip 3, Clip 4, and Clip 5 of the second sequence, respectively. While this example illustrates each sequence as including five media clips, in some embodiments, the first sequence may include more media clips than the second sequence and vice versa. In some embodiments, the sequences include several additional media clips as well. Furthermore, since time offsets are determined for multiple sequences, the same alignment can be performed on any additional sequences.

VIII. Identifying Overlapping Media Clips

Figure 13:
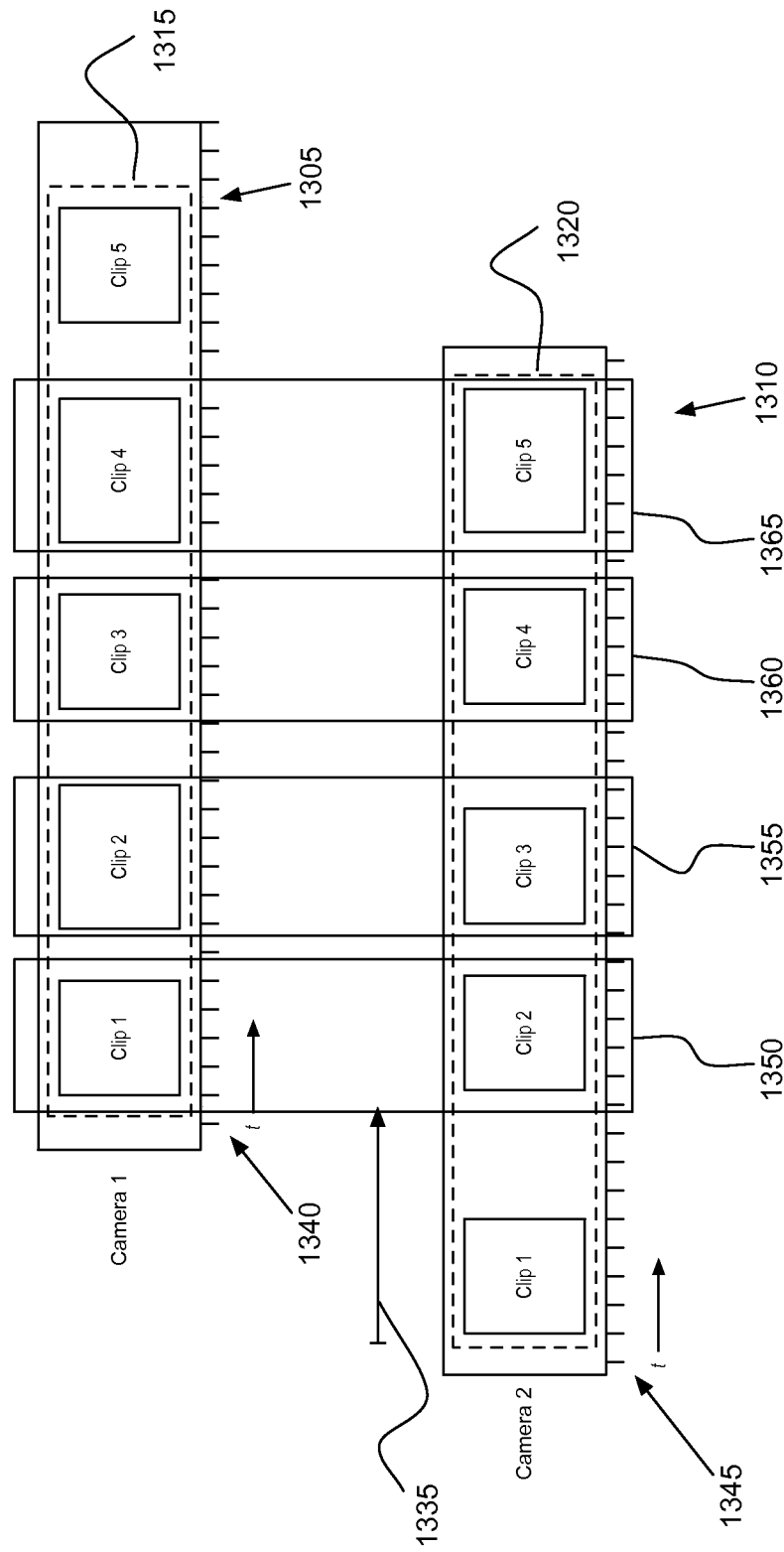
FIG. 13 conceptually illustrates identifying overlapping media clips of different sequences from different media recording sources in some embodiments.

Once the different sequences of media clips are properly aligned, the overlapping clips between the sequences are identified. FIG. 13 conceptually illustrates the identification of overlapping media clips in some embodiments. The time offset 1335 determined by comparing media clips 1315 from the first sequence 1305 to media clips 1320 of the second sequence 1310 provides a hypothesis of how the two sequences align. The first sequence 1305 represents a series of media clips recorded by Camera 1 chronologically arranged on a first timeline 1340. The second sequence 1310 represents a series of media clips recorded by Camera 2 chronologically arranged on a second timeline 1345. Applying the time offset 1335, as described in FIG. 12, aligns the media clips of the first sequence to the media clips of the second sequence and synchronizes the timelines of the first and second sequences.

Once the media clips from the two sequences are aligned, the media clips from each of the two sequences that overlap with one another are identified. Overlapping media clips are identified as those pairs of clips (1350, 1355, 1360 and 1365) from different sequences that occupy the same time on a synchronized timeline. For example, after the time offset is applied, Clip 1 from the first sequence and Clip 2 from the second sequence are determined to be overlapping clips. That is, the pair of media clips 1350 is identified as media recordings of the same event that overlap in time. While the two clips did not start and stop recording at the same time, at least a part of each of the two media clips are shown to have recorded the same event at the same time.

Clip 2 of the first sequence and Clip 3 of the second sequence is another example of a pair of clips 1355 that are determined to be overlapping. Clip 2 of the first sequence represents a media clip that started recording before and stopped recording after Clip 3 of the second sequence was recorded. Therefore, the two clips are shown to be overlapping clips in this example. Clip 3 of the first sequence and Clip 4 of the second sequence, as well as Clip 4 of the first sequence and Clip 5 of the second sequence, are also identified as overlapping pairs of media clips 1360 and 1365, respectively. While this example illustrates four unique pairs of overlapping media clips, in some embodiments two media clips from one sequence may overlap with different sections of a single clip of another sequence. Furthermore, in some embodiments, each sequence includes additional media clips that are arranged in chronological order and that produce overlaps.

IX. Audio Synchronization—Fine Tuning

Figure 14:
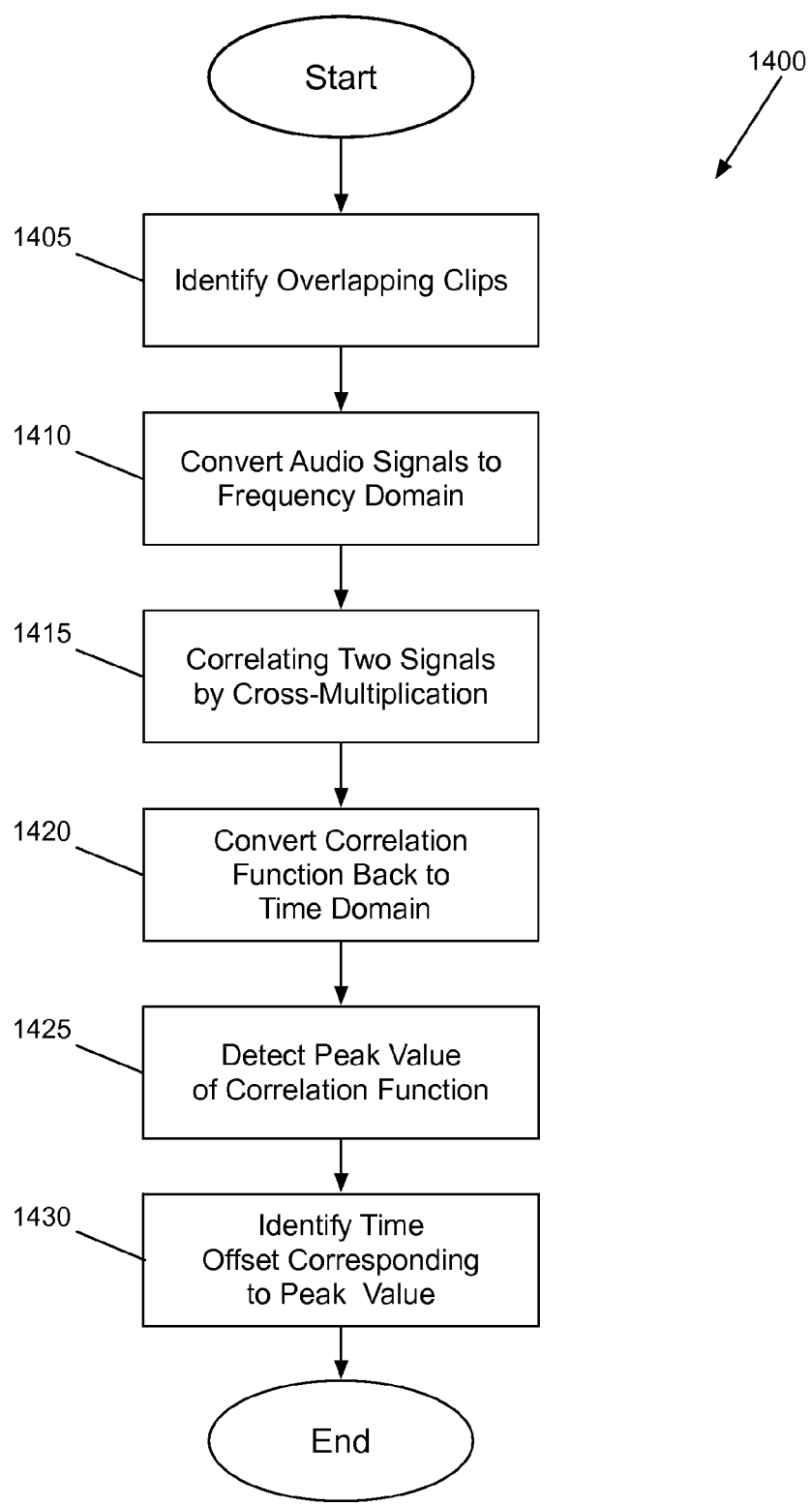
FIG. 14 conceptually illustrates a process of fine-tuning the overlapping media clips through audio synchronization in some embodiments.

Upon determining that a pair of media clips overlap, audio synchronization is performed on the pair of media clips to fine-tune the alignment. FIG. 14 conceptually illustrates a process 1400 of some embodiments for performing synchronization on the audio components of the media clips that are determined to be overlapping. As shown, process 1400 identifies (at 1405) pairs of media clips that overlap one another. Next, the process transforms (at 1410) the audio data from the first media clip and audio data from the second media clip of the overlapping pair of clips into a frequency domain, e.g. by performing a Fast Fourier Transform (FFT). Data transformed into the frequency domain data (e.g., FFT versions of audio data) includes a series of numbers that correspond to each frequency component of the audio data.

After the audio data from each of the two media clips are converted into the frequency domain, each frequency component of the audio data from the first media clip is multiplied (at 1415) with the complex conjugate version of each frequency component of the audio data from the second media clip. In some embodiments, each frequency component is normalized. The cross multiplication produces a frequency domain correlation function that includes a series of numbers that correspond to each frequency component of the correlation function.

Next, process 1400 transforms (at 1420) the frequency domain correlation function back into a time domain correlation function. Each sample of the time domain correlation function corresponds to a correlation value for a time offset between the first media clip and the second media clip. Specifically, the correlation value represents the probability of a match between the two media clips for each time offset. An example of such a correlation function is further described by reference to FIG. 15 below.

After the correlation function is transformed back into a time domain correlation function, process 1400 detects (at 1425) the peak (maximum) value of the time domain correlation function. Process 1400 further identifies (at 1430) a time offset that corresponds to the peak value of the correlation function. In some embodiments, the time offset that corresponds to the detected peak value is the time offset that, when applied to one of the pair of media clips, produces the best matched alignment between the pair of overlapping media clips.

A. Correlation Graph

Figure 15:
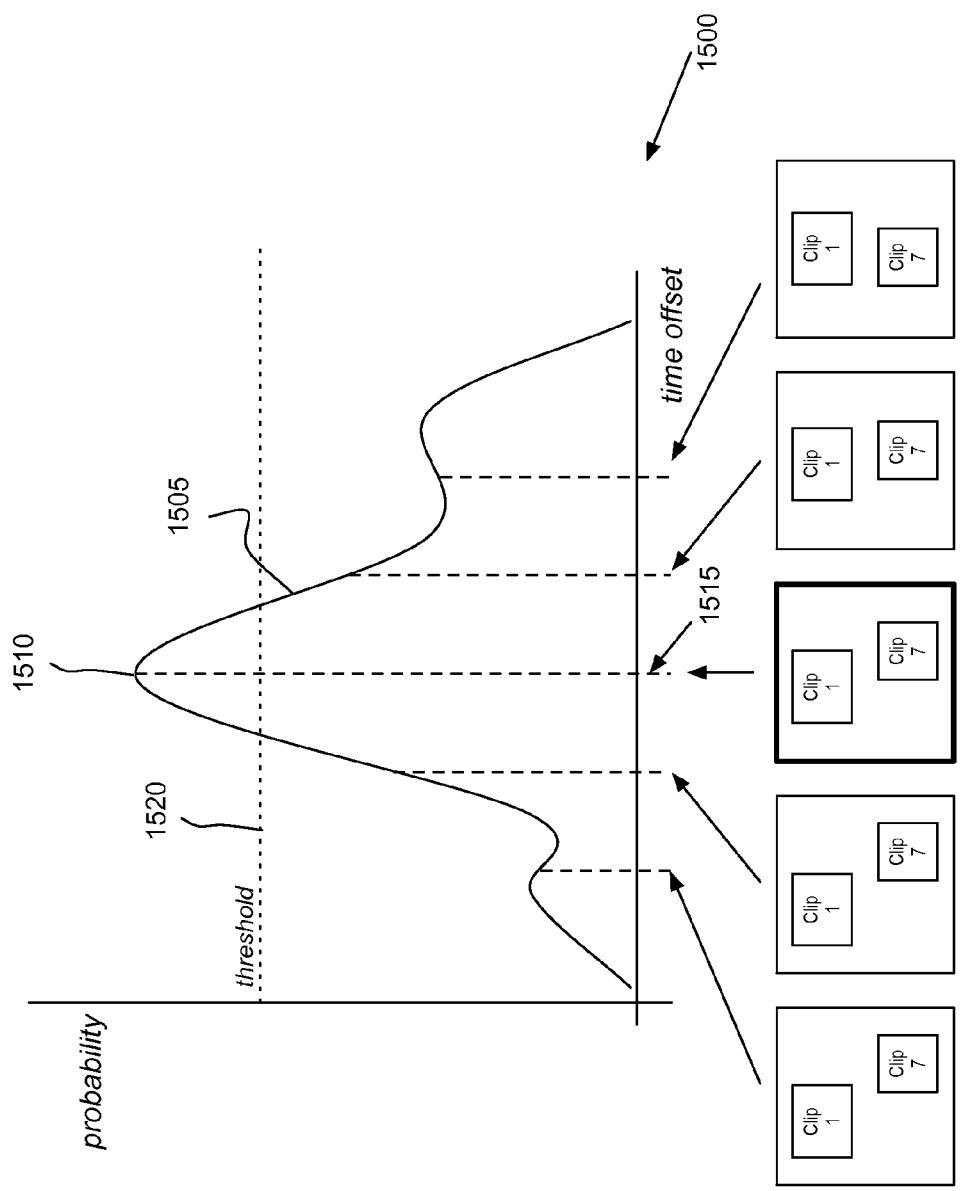
FIG. 15 conceptually illustrates an example of a correlation graph that maps a probability of match for each time offset analyzed in some embodiments.

FIG. 15 conceptually illustrates an example graph 1500, in some embodiments, of a correlation function 1505 in the time domain. The graph 1500 of the correlation function 1505 includes a peak value 1510 and a threshold value 1520. The x-axis of the graph corresponds to the time offset and the y-axis corresponds to a probability.

As mentioned above with reference to FIG. 14, the correlation function 1505 is a function that indicates the probability of two media clips matching each other at various time offsets. The peak of the correlation function 1510 corresponds to the timing offset 1515 at which the first and second media clips most likely match. In the example illustrated in FIG. 15, the peak of the correlation function occurs at a position on the horizontal axis that corresponds to an alignment of Clip 1 and Clip 2 as shown in the timing offset 1515.

The graph 1500 of the correlation function also includes a threshold value 1520 that represents a minimum probability required to produce a satisfactory match. Clip 1 and Clip 2 are considered a matching pair only when the peak correlation value 1510 exceeds the threshold 1520. In some embodiments, the threshold is determined based on a statistical analysis of the correlation function 1505. For example, some embodiments calculate an average value and a standard deviation of the correlation function 1505, and then set the threshold to be one or more standard deviations above the average value. The purpose of setting a threshold value in this fashion is to distinguish a true match from a false match. Two media clips that correlate with each other will likely have a sharp peak correlation value that is at least one or more standard deviations above the average value. Conversely, two poorly coordinated media clips will likely have a peak correlation value that does not exceed such a threshold.

B. Correlation Functions

Figure 16:
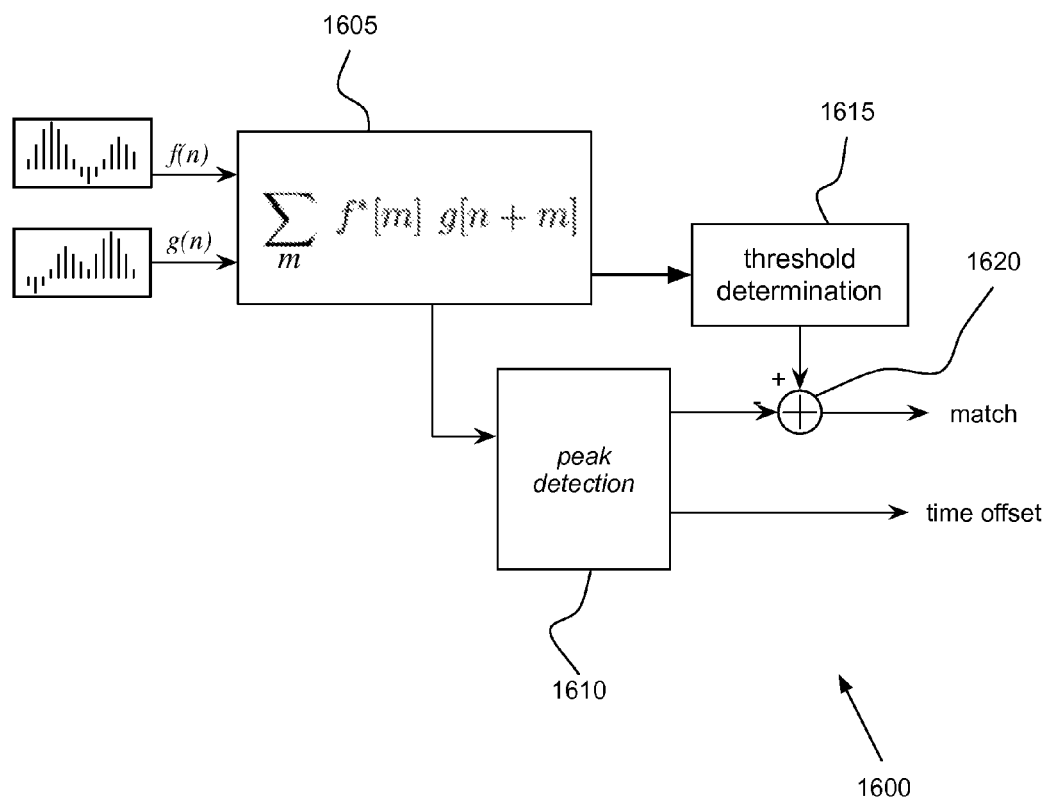
FIG. 16 conceptually illustrates an example block diagram of a cross correlation pairing detection module that uses cross correlation for determining a match of audio signals in some embodiments.
Figure 17:
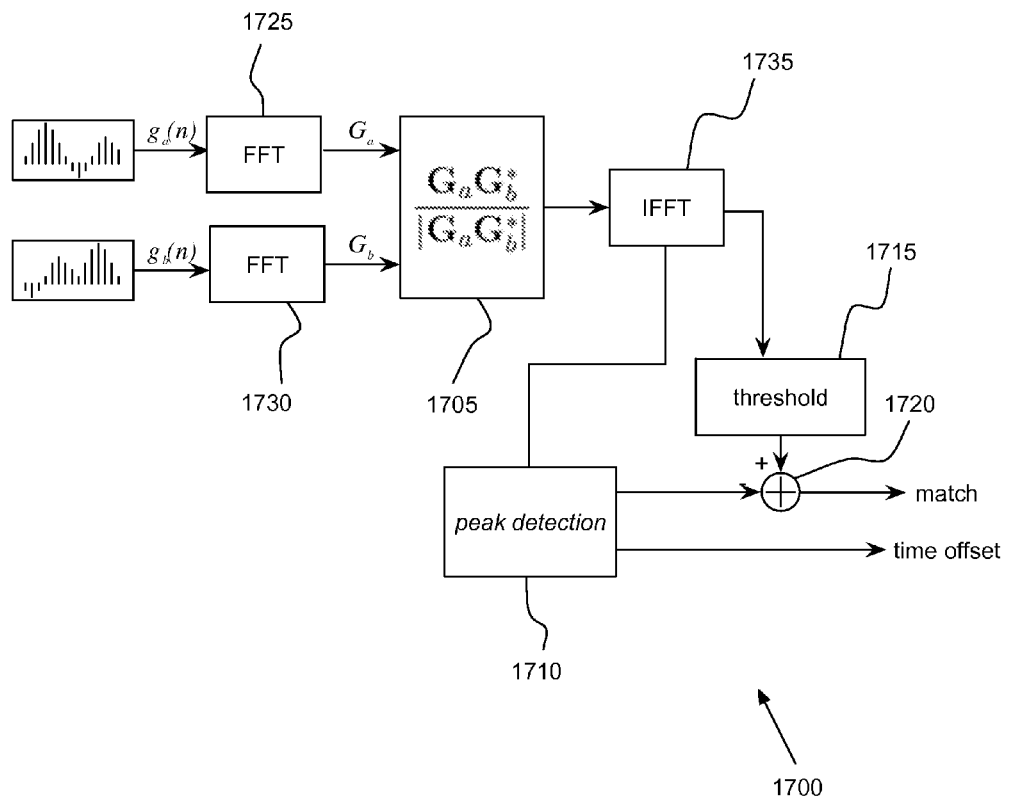
FIG. 17 conceptually illustrates an example block diagram of a phase correlation pairing detection module that uses phase correlation for determining a match of audio signals in some embodiments.

Correlation graphs such as the one described by reference to FIG. 15 are produced by correlation functions. FIG. 16 illustrates an example time domain cross correlation operation and FIG. 17 illustrates an example frequency domain phase correlation operation.

1. Cross Correlation

FIG. 16 conceptually illustrates an example block diagram of a cross correlation pairing detection module 1600 of some embodiments that uses cross correlation to determine pairing of different media clips. As shown, a cross correlation pairing detection module 1600 includes a time domain correlation module 1605, a peak detection module 1610, a threshold determination module 1615, and a match indicator 1620. Audio signals from a pair of media clips (each from a different sequence) are fed to the time domain correlation module 1605. Based on the contents the media clips, the time domain correlation module 1605 produces a correlation function in which each sample represents the degree of correlation between the two media clips at a particular time offset. An example of such a correlation function was described by reference to FIG. 15.

The peak detection module 1610 detects the peak (maximum) value 1510 in the correlation function 1505 shown in FIG. 15. When the peak correlation value satisfies the threshold 1520 provided by the threshold determination module 1615, the match indicator 1620 produces a match indication. In some embodiments, the determination of whether the comparison score satisfies the threshold is accomplished by using an adder, a subtractor, or other arithmetic logic in the match indicator 1620. In some embodiments, the peak detection module 1610 also determines and outputs the timing offset corresponding to the peak correlation value. This timing offset represents the best alignment match between the media clips. Examples of using the peak value in the correlation function to determine whether the two media clips match and to determine the timing offset between the two channels was previously described by reference to FIGS. 14 and 15.

Cross correlation is used in the frequency domain in order to reduce computational complexity in some embodiments. Cross correlating two media clips in the time domain, where each clip includes N discrete samples, requires an order of $N^2$ multiplication operations. Cross correlating two media clips in the frequency domain, on the other hand, requires only an order of N·log(N) multiplication operations. However, using phase correlation instead of cross correlation in the frequency domain normalizes out the relative amplitudes of the media clips. Accordingly, using phase correlation in the frequency domain results in a better data set in some embodiments.

2. Phase Correlation

FIG. 17 conceptually illustrates an example block diagram of a phase correlation pairing detection module 1700 that uses phase correlation to determine matching media clips in some embodiments. As shown, the phase correlation pairing detection module 1700 includes a frequency domain correlation module 1705, a peak detection module 1710, a threshold determination module 1715, and a match indicator 1720. In addition, the phase correlation pairing detection module 1700 includes Fast Fourier Transform (FFT) modules 1725 and 1730, and an Inverse Fast Fourier Transform (IFFT) module 1735.

Audio data from a candidate pair of media clips is transformed into the frequency domain by FFT modules 1725 and 1730. Frequency domain correlation module 1705 receives FFT versions of the first media clip and the second media clip, and performs correlation in the frequency domain. Unlike time domain data, which includes a series of time domain samples of the data, frequency domain data (e.g., FFT versions of audio signals from the first and second media clips) includes a series of numbers that correspond to each frequency component of the channel data.

The frequency domain correlation module 1705 multiplies each frequency component of the transformed first media clip with the complex conjugate version of each frequency component of the transformed second media clip. In some embodiments, the frequency correlation module 1705 normalizes each frequency component. This cross multiplication produces a frequency domain correlation function that includes a series of numbers corresponding to each frequency component of the correlation function. The IFFT module 1735 then transforms the frequency domain correlation function into a time domain correlation function, where each sample of the time domain correlation function corresponds to a correlation value at a time offset between the first media clip and the second media clip. An example of such a correlation function was described above by reference to FIG. 15.

The peak detection module 1710 detects the peak (maximum) value in the time domain correlation function, and uses the peak value as a comparison score. When the peak correlation value satisfies the threshold 1715, the match indicator 1720 produces a match indication. In some embodiments, the determination of whether the comparison score satisfies the threshold is accomplished by using an adder, a subtractor, or other arithmetic logic in the match indicator 1720. In some embodiments, the peak detection module 1710 also determines a timing offset between the media clips. This timing offset represents the best alignment match between the media clips.

X. User Markers

Figure 18:
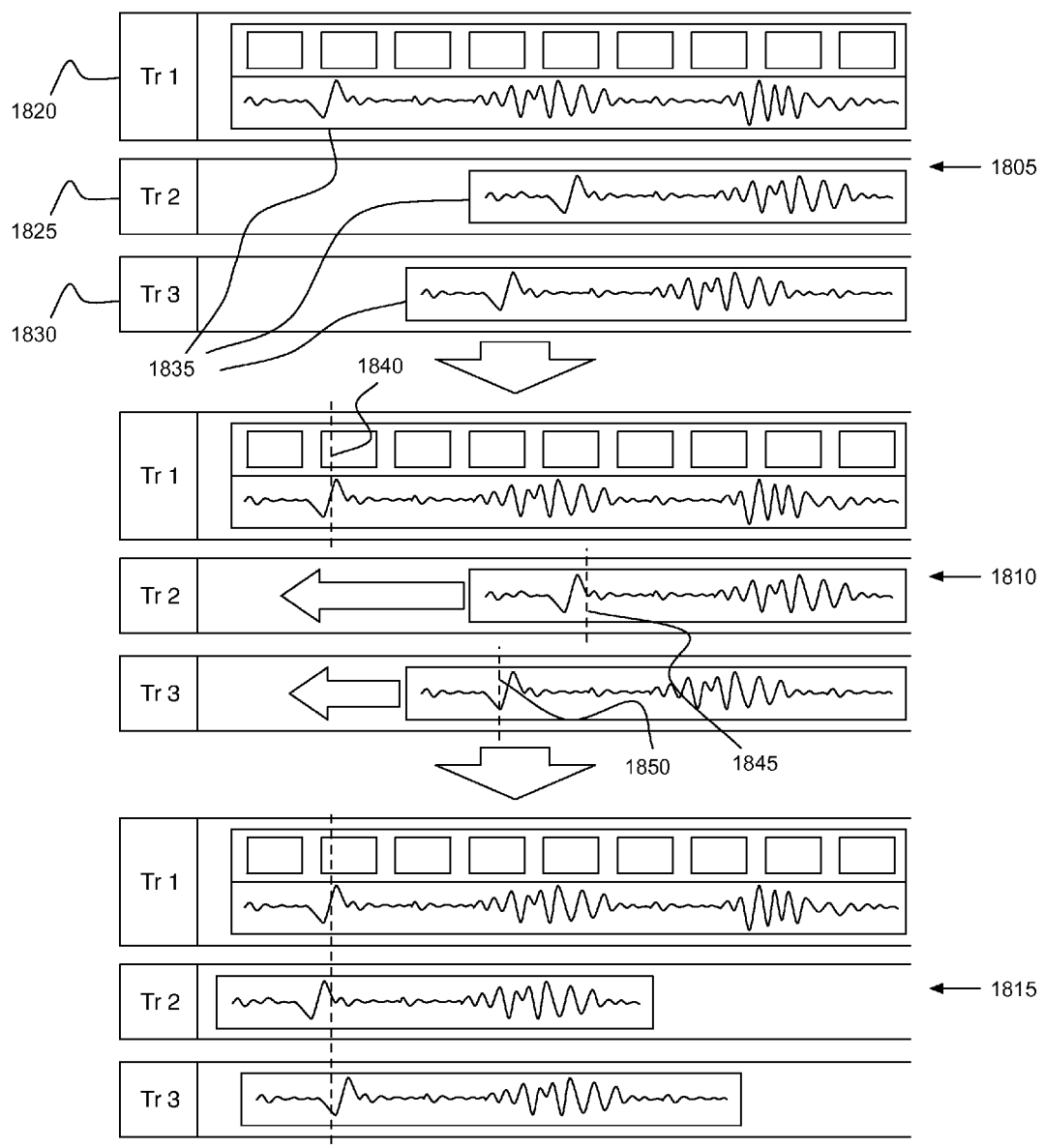
FIG. 18 conceptually illustrates alignment of media clips by using user markers in some embodiments.

In some embodiments, user marker information is utilized to expedite the audio synchronization by providing a point from which the synchronization analysis is started. FIG. 18 conceptually illustrates three different stages of user marker information being used in the audio synchronization process in some embodiments. User marker information is information input by a user to flag a location on a media clip. The user marker in some embodiments corresponds to a specific frame of a video media clip. In some embodiments, the user marker corresponds to a particular location on an audio media clip.

In the first stage 1805, a video clip 1820, which includes audio and video components, and two audio clips 1825 and 1830 are analyzed. At this stage, the media clips are not synchronized. That is, the audio signals of the three media clips are not aligned with each other. As shown by the characteristics of the audio signals, the media clip in track 3 1830 is shown to have slightly less offset than the media clip in track 2 1825, when the two media clips are compared to the media clip in track 1 1820. The user identifies these characteristics in a few different ways. In some embodiments, the user identifies the offset by visually observing the audio waveforms 1835 associated with each media clip. The user is also able to determine the offset by observing the playback of each of the media clips. For example, a clapper is a commonly used tool in the film industry that allows editors to identify an alignment of video and audio signals during editing. A video of the clapper provides a visual reference of the clapper closing. From this visual cue, an editor may synchronize audio media from auxiliary recording devices to correspond to the visual cue. For instance, the sound produced by the clapper is represented by a spike in the audio signal. The editor manually aligns the spike in the audio media to the visual cue from the video media.

When a user is able to identify points on two or more media clips that align with one another, the user drops user markers on those locations. The second stage 1810 illustrates user markers 1840, 1845, and 1850 placed on the media clips at locations where the user would like the three media clips to be aligned. In this example, the user identifies the first peak in the audio waveform of the three media clips as corresponding to one another. Accordingly, the user drops markers near the peak of each of the three media clips. The location of the user marker does not need to be precise since the marker provides a starting point from which audio synchronization is performed to fine-tune the alignment of the media clips.

The third stage 1815 illustrates the three media clips aligned according to the user marker. At this stage, track 2 and track 3 are shown to have been shifted to the left on the timeline in order to align the user markers of those tracks with the marker placed in track 1. The alignment represents a rough synchronization of the audio components of each of the three media clips. Since the user markers were not placed at the precise location of alignment in the three media clips in this example, the three audio components are slightly misaligned, as shown in the third stage. From those positions, audio synchronization is performed to more precisely align the three media clips.

XI. Adjusting for Time Drift

Figure 19:
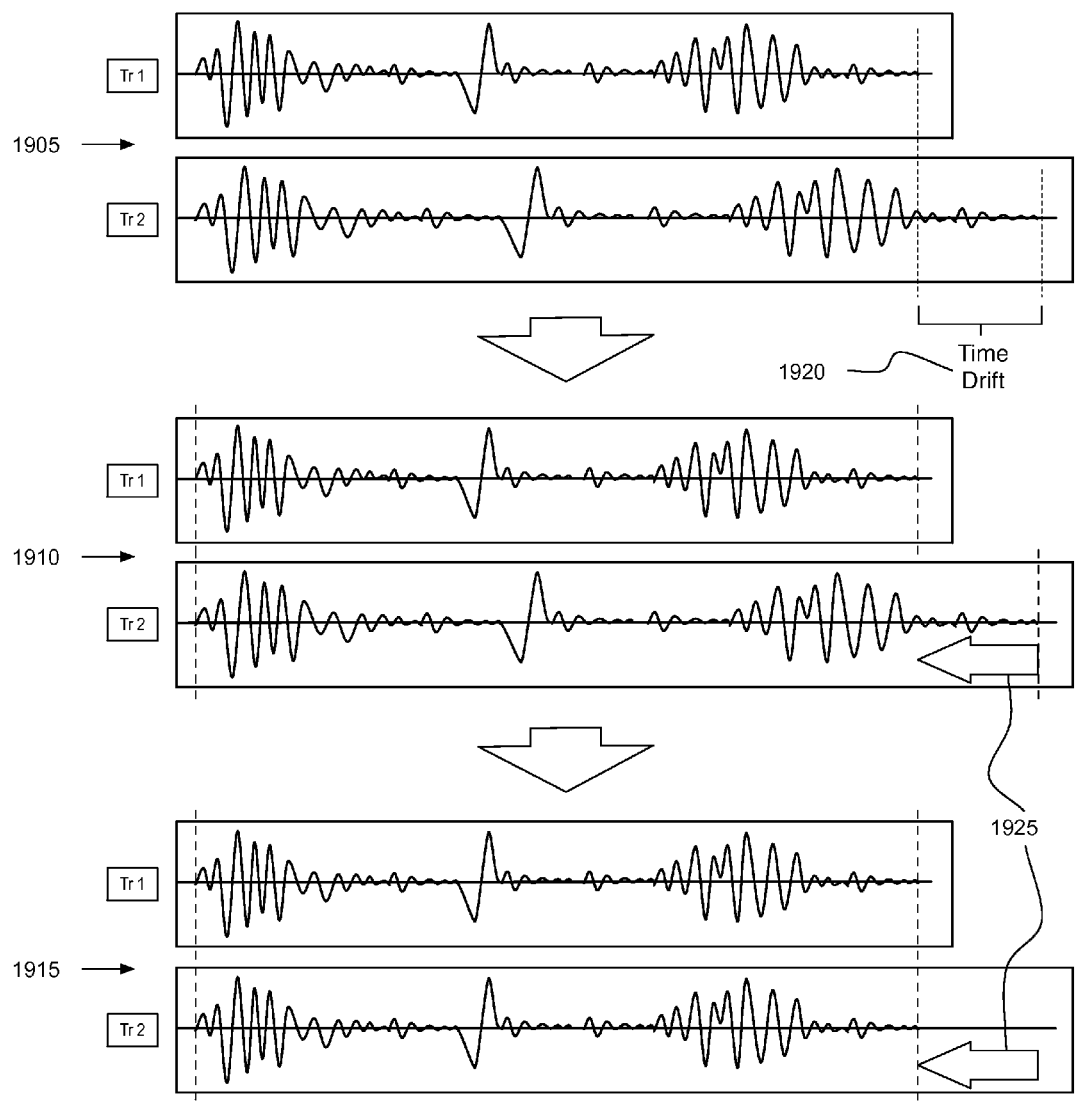
FIG. 19 conceptually illustrates intra-clip adjustment of time drift in some embodiments.

After certain media clips from different sequences are aligned, some embodiments detect and adjust for time drift between the sequences of media clips. FIG. 19 conceptually illustrates three different stages of intra-clip adjustment for time drift in some embodiments. Time drift occurs when media clips are produced by two or more media recording devices with incongruous clocks. For example, over the course of an hour, a clock of a first media recording device running a full second faster than a clock of a next media recording device produces a time drift. The clock of the second media recording device is observed as being $1/3600^{th}$ of a unit slower than the first clock. Since the first clock runs faster, the media clips produced by the first media recording device will appear to have been recorded over a longer period than the media clips produced by the second media recording device when both devices record the same event.

The first stage 1905 illustrates media clips from two different media recording devices that recorded the same exact event for the same amount of time. The media clip of track 2, however, is represented as being longer on the time domain than the media clip of track 1. This difference in time from two identical recordings indicates that the clocks of the media recording devices that produced the two media clips are incongruous. In this example, the clock of the media recording device that produced the media clip of track 2 runs faster than the clock of the corresponding media recording device that produced the media clip of track 1.

The second stage 1910 shows that the adjustment 1925 needs to be made to the media clip in track 2 in order to properly align it to correspond to the media clip in track 1. In some embodiments, this adjustment is performed by re-clocking the media clip. When an adjustment is applied, the media clip of track 2 properly represents a clip recorded with the same time unit as the media clip of track 1. Finally, the third stage 1915 illustrates the result of the media clip of track 2 after having been re-clocked to properly match the time unit of the media clip in track 1. As shown in the figure, the re-clocked media clip of track 2 is identical to that of the media clip of track 1.

Figure 20:
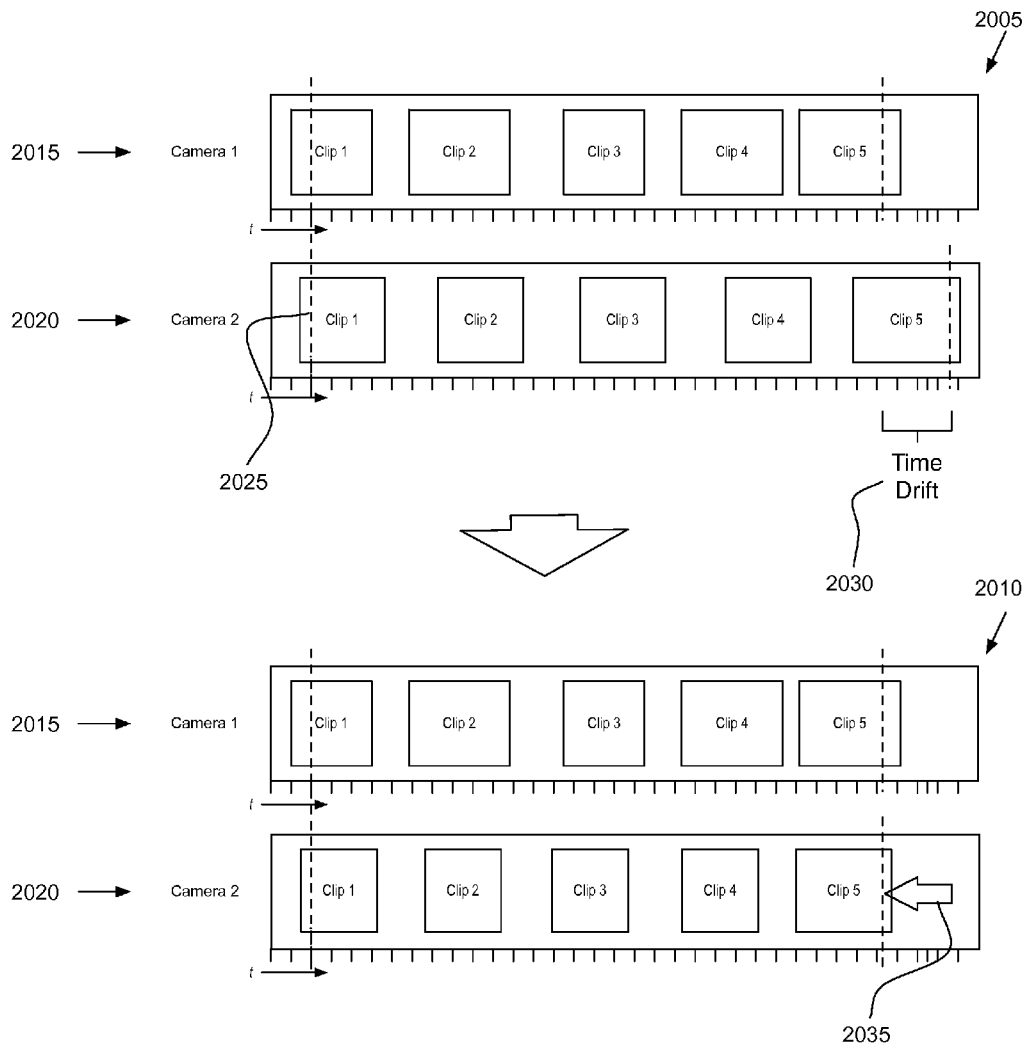
FIG. 20 conceptually illustrates inter-clip adjustment of time drift in some embodiments.

While the time drift discussed by reference to FIG. 19 involves a single pair of media clips, time drift generally becomes apparent only after some extended duration has passed. Accordingly, in some embodiments, adjustments for time drift that occurs over a duration that includes several media clips in a sequence must be made. FIG. 20 conceptually illustrates two different stages of inter-clip adjustment for this type of time drift in some embodiments.

In some embodiments, the audio synchronization process accounts for time drift over the course of a series of recorded media clips. As described above, time drift occurs when two or more media recording devices have clocks that don't have precisely coordinated units of time. The first stage 2005 illustrates five media clips in a sequence corresponding to Camera 1 2015 and five media clips in a sequence corresponding to Camera 2 2020. Clip 1 of Camera 1 and Clip 1 of Camera 2 are aligned through audio synchronization at an initial point 2025. However, as a result of time drift between Camera 1 and Camera 2, media clips at the end of the two sequences are no longer aligned. Specifically, Clip 5 of Camera 1 is no longer aligned with Clip 5 of Camera 2. In some embodiments, performing a second audio synchronization between two overlapping clips at the end of the sequences of Camera 1 and Camera 2 determines the extent of the time drift 2030.

Once the time drift has been determined, an adjustment 2035 is made to the sequence of Camera 2 such that the synchronization points of Clip 5 of both sequences are properly aligned, as illustrated in the second stage 2010. Utilizing clips at the beginning (Clip 1) and the end (Clip 5) of a sequence to determine clock drift ensures that all the intermediate clips are adjusted for the drift as well. In some embodiments, the sequence of media clips of Camera 2 is re-clocked to properly correspond to the sequence of Camera 1. The example illustrated in stage 2 2010 shows the sequence of media clips of Camera 2 having been re-clocked. In some embodiments, the spacing between the media clips of the sequence in Camera 2 is adjusted to compensate for time drift.

XII. Graphical User Interface

Figure 21:
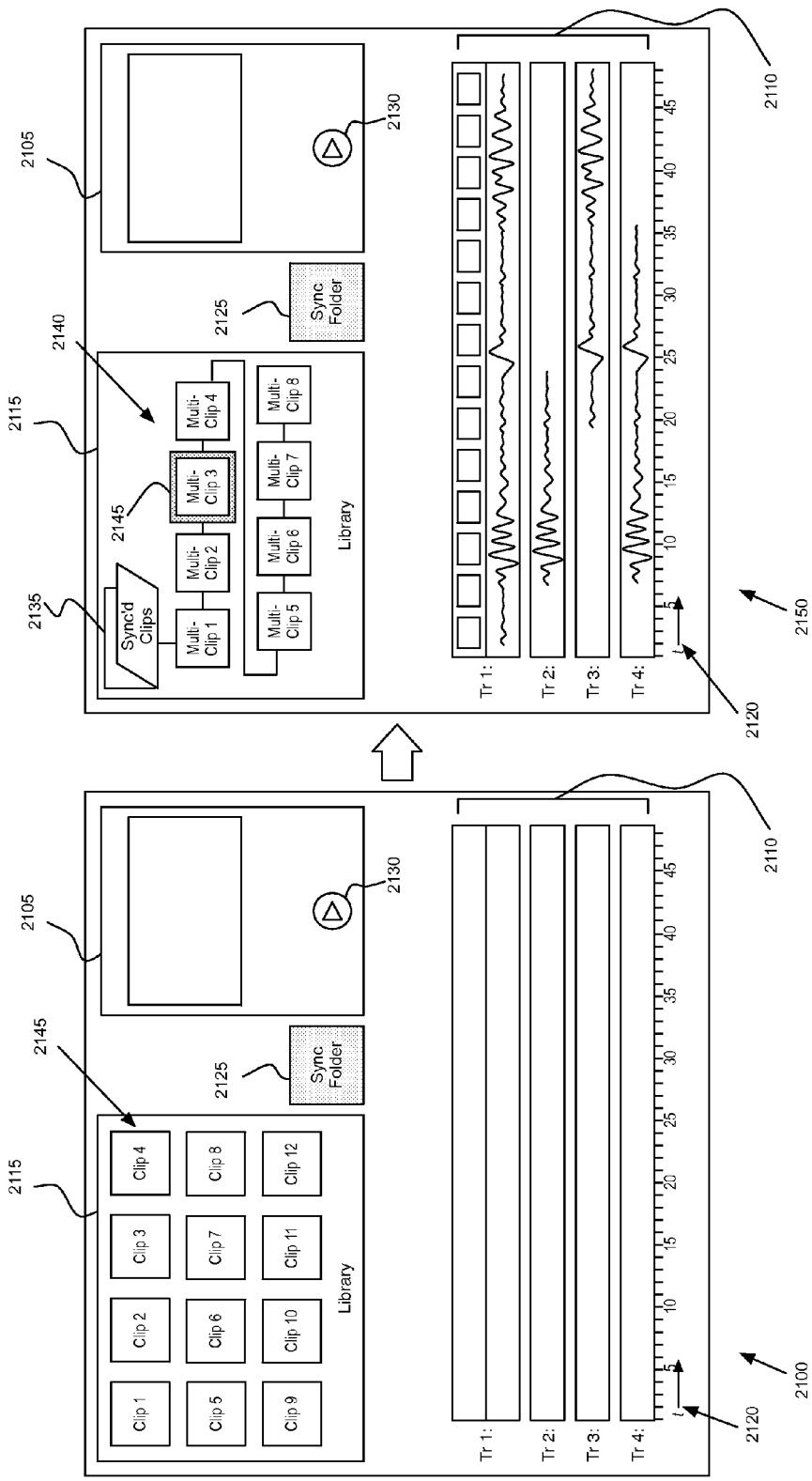
FIG. 21 conceptually illustrates a graphical user interface displaying multiple tracks of media clips to be analyzed and edited in some embodiments.

FIG. 21 conceptually illustrates a detailed graphical user interface (GUI) of the media-editing application in a first stage 2100 and in a second stage 2150. The GUI includes a media track area 2110 in some embodiments. The GUI further includes a preview display area 2105, a media library display area 2115, a timeline 2120, and a Sync Folder button 2125.

The preview display area 2105 displays a preview of the media clips added to the media track area. In some embodiments, the preview display area includes various video controls such as a play button 2130, fast forward and rewind buttons, etc., that a user can use to navigate the preview of the media clips. Previews of media clips are shown by sequentially displaying different frames of the media clips.

The Sync Folder button 2125 enables the user to initiate the synchronization of media clips. In the first stage 2100, the GUI displays unsynchronized media clips 2145 in the library display area 2115. The contents provided in the media library are determined by the user in some embodiments. That is, a user identifies a specific timeline or a particular source from which the user would like the library to display media clips. The media clips in the library are also sortable (i.e. by filename, date, etc.).

When a user selects the Sync Folder button 2125 (e.g., by placing a cursor over the button and pressing a button on a cursor controller, or by touching the button in a touchscreen application), media clips selected the media library are synchronized with one another and placed in chronological order in a Sync'd Clips folder 2135, as shown in the second stage 2150. In some embodiments, all media clips from a folder in the media library are synchronized with one another and placed in a Synchronized Clips folder.

In some embodiments, the media library display area 2115 in the second stage displays the Sync'd Clips folder 2135. The Sync'd Clips folder includes several multi-clips 2140 where each multi-clip represents a time-coincident group of media clips synchronized with one another. In some embodiments, the plurality of multi-clips is arranged in chronological order in the folder. Each multi-clip included in the folder is graphically represented, in some embodiments, by an image (e.g., a particular frame) from a particular video clip included in the multi-clip. When a user selects a multi-clip from the folder, the time-coincident group of media clips are expanded and graphically shown in the media track area 2110.

In this example, the user has selected Multi-Clip 3 2145. The media track area 2110 in FIG. 21 provides a visual representation of each of the synchronized time coincident media clips included in a multi-clip. Specifically, the media track area 2110 displays frames of a video media clip as well as audio waveforms of auxiliary audio clips and the video media clip. The media track area includes a timeline 2120 spanned by the multiple tracks. In this example, Multi-Clip 3 includes four synchronized tracks (one video, including corresponding audio, and three audio tracks) in the GUI. Some embodiments include several additional tracks that can be shown at one time in the media track area.

Figure 22:
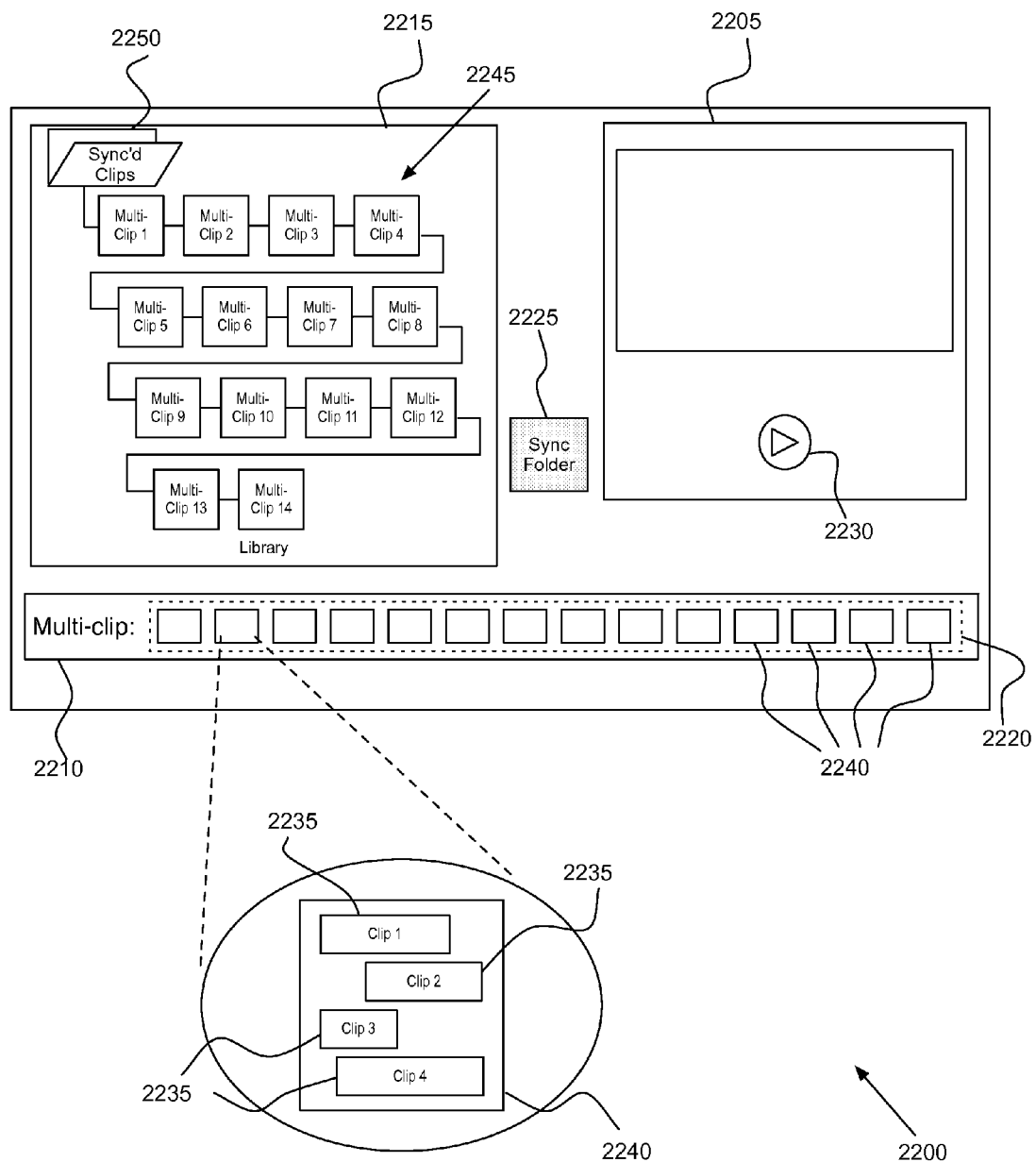
FIG. 22 conceptually illustrates a graphical user interface displaying a multi-clip generated as a result of the synchronization process in some embodiments.

FIG. 22 conceptually illustrates a detailed graphical user interface (GUI) 2200 of the media-editing application that includes a multi-clip sequence output area 2210 described in some embodiments. The GUI further includes a preview display area 2205, a media library display area 2215, and a synchronization button 2225.

The Sync Folder button 2225 enables the user to initiate the synchronization of media clips. When a user selects the Sync Folder button 2225 (e.g., by placing a cursor over the button and pressing a button on a cursor controller, or by touching the button in a touchscreen application), media clips selected the media library are synchronized with one another and placed in chronological order in a Sync'd Clips folder 2250. In some embodiments, all media clips from a folder in the media library are synchronized with one another and placed in a Sync'd Clips folder. Once the media clips are synchronized, a multi-clip sequence 2210 is provided. The multi-clips are also placed in chronological order in the media library display area 2215 in a Sync'd Clips folder 2250. The Sync'd Clips folder includes several multi-clips 2245 where each multi-clip represents a time-coincident group of media clips synchronized with one another.

GUI 2200 further includes a multi-clip sequence output area 2210. The multi-clip sequence output area displays a plurality 2220 of multi-clips 2240. The multi-clips displayed in the multi-clip sequence output area represent the multi-clips arranged in chronological order in the Sync'd Clips folder 2250. Each multi-clip 2240 represents a time-coincident group of media clips 2235. The media clips 2235 of each multi-clip 2240 are synchronized with one another. In some embodiments, the plurality 2220 of multi-clips 2240 is arranged in chronological order and each multi-clip 2240 is separated by a certain time gap from the next. The presentation of the plurality of multi-clips in this fashion facilitates review of the media clips by the user.

XIII. Media Content Synchronization

Figure 23:
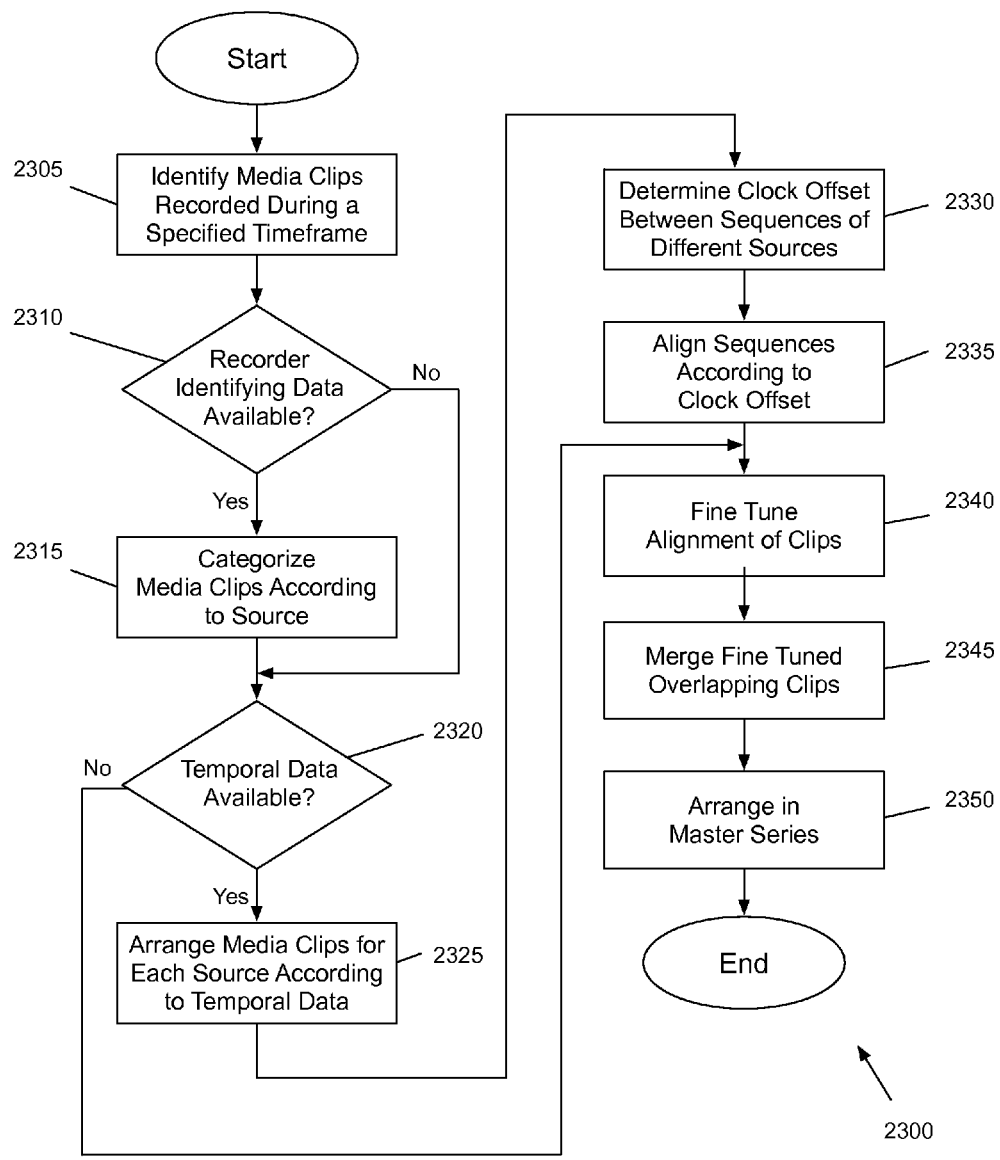
FIG. 23 conceptually illustrates a process of synchronizing media clips recorded during a specified timeframe in some embodiments.

FIG. 23 conceptually illustrates a process 2300 for synchronizing several media clips from a specified timeframe in some embodiments. For example, the process synchronizes a day's worth of recorded media clips as illustrated in FIG. 3 (synchronize media clips in folder 345 that includes all media clips from Day 2). As shown, process 2300 identifies (at 2105) media clips that were recorded within the specified timeframe. The time of each media clip recording is determined by temporal data saved as metadata on the media clips as discussed by reference to FIG. 4 above. Media clips with temporal data that falls within the specified time frame are considered in the synchronization process.

Next, the process determines (at 2310) whether or not recorder identifying data is available. When recorder identifying data is available, process 2300 categorizes (at 2315) media clips according to source. The process identifies the media recording source of each media clip by the recorder identifying data. Process 2300 then sorts each media clip into groups according to the source. Specifically, media clips from a first source are sorted into a group corresponding to the first source, media clips from a second source are sorted into a group corresponding to the second source, etc. The process then proceeds to 2320, which is described below. When recorder identifying data is not available, the process determines (at 2320) whether or not temporal data is available. Temporal data, as described above with reference to FIG. 4, is time code information that is an actual time and date of the video media clip recording or an elapsed time of the device recording the media. In some embodiments, temporal data is file creation time information.

When temporal data is not available, the process proceeds to 2340, which is described below. When temporal data is available, process 2300 arranges (at 2325) each of the media clips according to temporal data. The media clips for each source are placed in chronological order in accordance to the temporal data. The process arranges the media clips in a sequence with proper offset from each other. That is, the spacing between each media clip of the sequence represents an actual elapsed time between the stoppage of the recording of one clip and the start of the recording of a next clip.

After the media clips are arranged in their respective sequences, process 2300 determines (at 2330) a time offset between sequences of different sources. The time offset represent the difference in actual time between the start of a first sequence and the start of a second sequence, the first sequence being from a first source group and the second sequence from a second source group. In other words, the time offset is applied to the sequence of the first source in order align it with a sequence of the second source so that the media clips of each sequence are roughly synchronized in time. The details of how time offset is determined was described with reference to FIGS. 10 and 11. After determining the time offsets, process 2300 aligns (at 2335) the sequences of each of the source groups according to the determined time offsets. The process applies the respective time offsets to shift each sequence into alignment with one another.

Next, the process fine-tunes (at 2340) the alignment of media clips by performing audio synchronization on the media clips. When the media clips are not aligned (e.g. media clips that do not contain temporal data and thus are not sequenced in chronological order), the process iteratively compares each media clip from a first sequence to a media clip from a second sequence to determine whether any matches exist. Audio synchronization is achieved by phase correlating audio data from two associated audio media. Phase correlation produces a function that indicates the probability of a match between two media clips for each time offset. From this function, a time offset is determined and applied to align two overlapping media clips. The details of phase correlating two media clips were described above in reference to FIGS. 15 and 17.

Next, process 2300 merges (at 2345) each set of clips that has been fine-tuned into a single multi-clip. In some embodiments, each multi-clip includes at least two clips. Each clip included in a multi-clip must be from a unique sequence (i.e. unique media recording device) since a single media recording device cannot record two different clips that overlap. The multi-clips are then arranged (at 2350) into a master series. The master series includes a series of multi-clips where each multi-clip represents two or more overlapping recordings that are synchronized with each another. In some embodiments, the multi-clips are arranged in chronological order and separated by a predetermined time duration. For example, a user specifies a five second pause in between each multi-clip. In this situation, a five second pause is inserted between each multi-clip on the master series. Once the multi-clips are arranged, the process exits.

XIV. Software Architecture

Many of the above-described features and applications are implemented as software processes that are specified as a set of instructions recorded on a computer readable storage medium (also referred to as computer readable medium). When these instructions are executed by one or more computational element(s) (such as processors or other computational elements like application specific integrated circuits (ASICs) and field programmable gate arrays (FPGAs)), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 24:
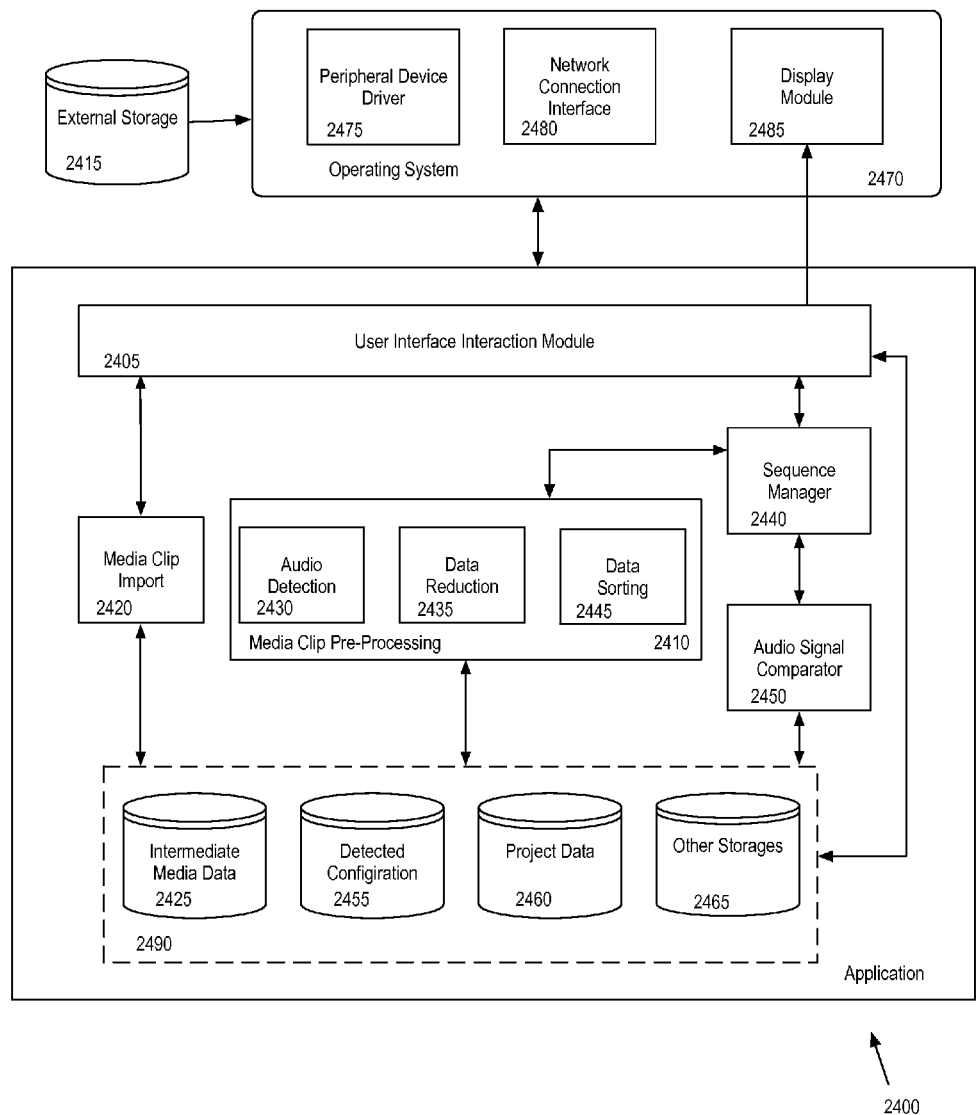
FIG. 24 conceptually illustrates the software architecture of a media-editing application of some embodiments in some embodiments.

In some embodiments, the processes described above are implemented as software running on a particular machine, such as a computer or a handheld device, or stored in a computer readable medium. FIG. 24 conceptually illustrates the software architecture of a media editing application 2400 of some embodiments. In some embodiments, the media editing application is a stand-alone application or is integrated into another application, while in other embodiments the application might be implemented within an operating system. Furthermore, in some embodiments, the application is provided as part of a server-based solution. In some of these embodiments, the application is provided via a thin client. That is, the application runs on a server while a user interacts with the application via a separate machine that is remote from the server. In other such embodiments, the application is provided via a thick client. That is, the application is distributed from the server to the client machine and runs on the client machine.

The media editing application 2400 includes a user interface (UI) module 2405, a media clip import module 2420, a media clip pre-processing module 2410, a sequence manager 2440, and an audio signal comparator 2450. The media editing application also includes intermediate media data storage 2425, detected configuration storage 2455, project data storage 2460, and other storages 2465. In some embodiments, the intermediate audio data storage 2425 stores media clips that have been processed by modules of the media editing application, such as the imported media clips that have been properly sorted and arranged in a predefined order. In some embodiments, storages 2425, 2455, 2460, and 2465 are all stored in one physical storage 2490. In other embodiments, the storages are in separate physical storages, or three of the storages are in one physical storage, while the fourth storage is in a different physical storage.

FIG. 24 also illustrates an operating system 2470 that includes a peripheral device driver 2475, a network connection interface 2480, and a display module 2485. In some embodiments, as illustrated, the peripheral device driver 2475, the network connection interface 2480, and the display module 2485 are part of the operating system 2470, even when the media production application is an application separate from the operating system.

The peripheral device driver 2475 may include a driver for accessing an external storage device 2415 such as a flash drive or an external hard drive. The peripheral device driver 2475 delivers the data from the external storage device to the UI interaction module 2405. The peripheral device driver 2475 may also include a driver for translating signals from a keyboard, mouse, touchpad, tablet, touchscreen, etc. A user interacts with one or more of these input devices, which send signals to their corresponding device drivers. The device driver then translates the signals into user input data that is provided to the UI interaction module 2405.

The media editing application 2400 of some embodiments includes a graphical user interface that provides users with numerous ways to perform different sets of operations and functionalities. In some embodiments, these operations and functionalities are performed based on different commands that are received from users through different input devices (e.g., keyboard, track pad, touchpad, touchscreen, mouse, etc.) For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The UI interaction module 2405 also manages the display of the UI, and outputs display information to the display module 2485. The display module 2485 translates the output of a user interface for a display device. That is, the display module 2485 receives signals (e.g., from the UI interaction module 2405) describing what should be displayed and translates these signals into pixel information that is sent to the display device. The display device may be an LCD, plasma screen, CRT monitor, touchscreen, etc.

The network connection interface 2480 enables the device on which the media editing application 2400 operates to communicate with other devices (e.g., a storage device located elsewhere in the network that stores the media clips) through one or more networks. The networks may include wireless voice and data networks such as GSM and UMTS, 802.11 networks, wired networks such as Ethernet connections, etc.

The UI interaction module 2405 of media production application 2400 interprets the user input data received from the input device drivers and passes it to various modules, including the media clip import module 2420 and the sequence manager 2440. The UI interaction module also manages the display of the UI, and outputs this display information to the display module 2485. The UI display information may be based on information from the sequence manager 2530, from detected configuration data storage 2455, or directly from input data (e.g., when a user moves an item in the UI that does not affect any of the other modules of the application 2400).

The media clip import module 2420 receives media clips (from an external storage via the UI module 2405 and the operating system 2485), and stores the media clips into intermediate audio data storage 2425.

The media clip pre-processing module 2410 fetches the media clips and performs audio detection, data reduction, and data sorting operations. Each of these functions fetches media clips from the intermediate audio data storage 2425, and performs a set of operations on the fetched data (e.g., data reduction or sorting) before storing a set of processed media clips into the intermediate audio data storage 2425. In some embodiments, the media clip pre-processing module 2410 also directly communicates with the sequence manager module 2440 to report the result of the pre-processing operation (e.g., to report how the media clips are arranged in relation to one another).

The audio signal comparator module 2450 receives selections of audio signals from the sequence manager 2440 and retrieves two sets of audio data from the intermediate media data storage 2425. The audio signal comparator module 2450 then performs the audio comparison operation and stores the intermediate result in storage. Upon completion of the comparison operation, the audio signal comparator 2450 communicates with the sequence manager 2440 as to whether the two media clips are a match pair.

The sequence manager module 2440 receives a command from the UI module 2405, receives the result of the preprocessing operation from the media clip data pre-processing module 2410, and controls the audio signal comparator module 2450. The sequence manager 2440 selects pairs of media clips for comparison and directs the audio signal comparator 2450 to fetch the corresponding media clips from storage for comparison. The sequence manager 2440 then compiles the result of the comparison and stores that information in the detected configuration storage 2455 for the rest of the media editing application 2400 to process. The media editing application 2400 in some embodiments retrieves this information and determines the proper way to order the media clips.

While many of the features have been described as being performed by one module (e.g., the sequence manager 2440 and the audio signal comparator 2450) one of ordinary skill in the art will recognize that the functions described herein might be split up into multiple modules. Similarly, functions described as being performed by multiple different modules might be performed by a single module in some embodiments (e.g., audio detection, data reduction, noise filtering, etc.).

XV. Computer System

Figure 25:
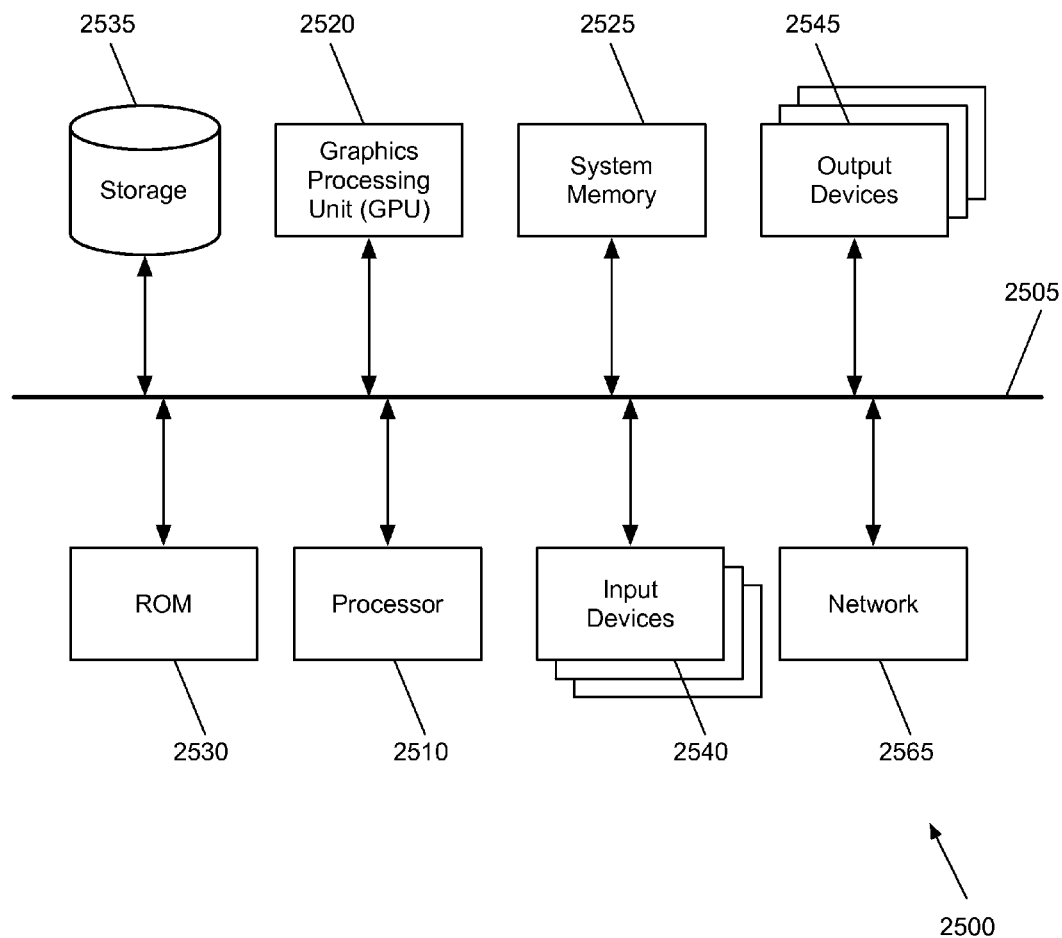
FIG. 25 conceptually illustrates a computer system with which some embodiments of the invention are implemented.

FIG. 25 conceptually illustrates a computer system with which some embodiments of the invention are implemented. Such a computer system includes various types of computer readable media and interfaces for various other types of computer readable media. One of ordinary skill in the art will also note that the digital video camera of some embodiments also includes various types of computer readable media. Computer system 2500 includes a bus 2505, a processor 2510, a graphics processing unit (GPU) 2520, a system memory 2525, a read-only memory 2530, a permanent storage device 2535, input devices 2540, and output devices 2545.

The bus 2505 collectively represents all system, peripheral, and chipset buses that communicatively connect the numerous internal devices of the computer system 2500. For instance, the bus 2505 communicatively connects the processor 2510 with the read-only memory 2530, the GPU 2520, the system memory 2525, and the permanent storage device 2535.

From these various memory units, the processor 2510 retrieves instructions to execute and data to process in order to execute the processes of the invention. In some embodiments, the processor comprises a FPGA, an ASIC, or various other electronic components for executing instructions.

Some instructions are passed to and executed by the GPU 2520. The GPU 2520 can offload various computations or complement the image processing provided by the processor 2510. In some embodiments, such functionality can be provided using CoreImage's kernel shading language.

The read-only-memory (ROM) 2530 stores static data and instructions that are needed by the processor 2510 and other modules of the computer system. The permanent storage device 2535, on the other hand, is a read-and-write memory device. This device is a non-volatile memory unit that stores instructions and data even when the computer system 2500 is off. Some embodiments of the invention use a mass-storage device (such as a magnetic or optical disk and its corresponding disk drive) as the permanent storage device 2535.

Other embodiments use a removable storage device (such as a floppy disk, flash drive, or ZIP® disk, and its corresponding disk drive) as the permanent storage device. Like the permanent storage device 2535, the system memory 2525 is a read-and-write memory device. However, unlike storage device 2535, the system memory is a volatile read-and-write memory, such a random access memory. The system memory stores some of the instructions and data that the processor needs at runtime. In some embodiments, the invention's processes are stored in the system memory 2525, the permanent storage device 2535, and/or the read-only memory 2530. For example, the various memory units include instructions for processing multimedia items in accordance with some embodiments. From these various memory units, the processor 2510 retrieves instructions to execute and data to process in order to execute the processes of some embodiments.

The bus 2505 also connects to the input and output devices 2540 and 2545. The input devices enable the user to communicate information and select commands to the computer system. The input devices 2540 include alphanumeric keyboards and pointing devices (also called "cursor control devices"). The output devices 2545 display images generated by the computer system. The output devices include printers and display devices, such as cathode ray tubes (CRT) or liquid crystal displays (LCD).

Finally, as shown in FIG. 25, bus 2505 also couples computer 2500 to a network 2565 through a network adapter (not shown). In this manner, the computer can be a part of a network of computers (such as a local area network ("LAN"), a wide area network ("WAN"), or an Intranet, or a network of networks, such as the internet. Any or all components of computer system 2500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to ASICs, FPGAs, programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For example, many of the media editing application GUIs illustrated in the figures show only a preview display area and media tracks area. One of ordinary skill in the art will understand that the features illustrated in these figures may be incorporated into a more complete media editing GUI such as is illustrated in FIG. 2-3, 21 or 22.

In addition, a number of the figures (including FIGS. 5, 7, 10, 14, and 23) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Also, the words "embodiment" and "embodiments" are used throughout this specification to refer to the embodiments of the current invention. Thus, one of ordinary skill in the art would understand that the invention is not to be limited by the foregoing illustrative details, but rather is to be defined by the appended claims.

What is claimed is:

1. A method of organizing media clips captured by two media recording devices, the method comprising:
   arranging a plurality of media clip files into a first sequence of media clip files and a second sequence of media clip files, wherein media clip files are sorted into the first sequence based on recording device identifying data in the media clip files identifying a first recording device used to capture the media clip files of the first sequence during a first plurality of recording sessions, wherein media clip files are sorted into the second sequence based on recording device identifying data in the media clip files identifying a second recording device used to capture the media clip files of the second sequence during a second plurality of recording sessions, and wherein the media clip files in each sequence are spaced apart from each other by respective non-zero actual elapsed time between a stoppage of one recording session and a start of a next recording session;
   performing pre-processing operations on the media clip files, the pre-processing operations comprising one of filtering out noise, applying equalization to target specific frequencies, normalizing balance levels, and applying dynamics processing to balance levels;
   analyzing content data of the media clip files in the first sequence and the second sequence to identify a pair of candidate media clip files in the sequences that temporally overlap;
   analyzing the candidate media clip files to determine a time offset between the candidate media clip files; and
   applying the time offset to shift all of the media clip files in the first sequence in relation to the media clip files in the second sequence.

2. The method of claim 1, wherein arranging the media clip files into sequences further comprises putting the media clip files of each of the sequences into chronological order according to time code data associated with the media clip files.

3. The method of claim 1, wherein arranging the media clip files into sequences further comprises putting the media clip files of each of the sequences into chronological order according to file creation time data associated with the media clip files.

4. The method of claim 1, wherein analyzing the candidate media clip files to determine the time offset comprises:
   correlating audio content of the candidate media clip files; and
   identifying a peak value of a correlation function.

5. The method of claim 4, wherein correlating comprises performing a frequency domain phase correlation to normalize out relative amplitudes of the candidate media clip files to produce a more accurate result.

6. The method of claim 4, wherein applying the time offset to shift all of the media clip files in the first sequence comprises aligning the sequences according to the determined time offset, wherein the time offset corresponds to the peak value of the correlation function when the peak value of the correlation function satisfies a threshold value, wherein the threshold value is based on a statistical analysis of the correlation function performed on the candidate media clip files.

7. The method of claim 1, wherein analyzing content data of the media clip files comprises identifying a media clip file in each sequence that includes a metadata marker placed by a user to indicate a match.

8. The method of claim 1, wherein analyzing content data of the media clip files comprises:
   selecting a first media clip file in the first sequence;
   comparing time code data of the first media clip file to time code data of the plurality of media clip files in the second sequence; and
   identifying a second media clip file from the plurality of media clip files that includes time code data indicating that the second media clip file was recorded during an overlapping time period with the first media clip file.

9. The method of claim 1 further comprising:
   performing data reduction operations on the media clip files, the data reduction operations comprising reducing the sample rate, skipping silent sections, and reducing quiet sections to silence; and
   identifying a starting point in each sequence at which to start offsetting the sequences, each starting point identified based on at least one of a marker and a point of likely alignment.

10. A method of organizing media clips, the method comprising:

importing a plurality of media clip files captured by a plurality of media recording devices during a particular timeframe; and performing an automated process comprising:

arranging the plurality of media clip files into a first sequence of media clip files and a second sequence of media clip files, wherein media clip files are sorted into the first sequence based on recording device identifying data in the media clip files identifying a first media recording device used to capture the media clip files of the first sequence during a first plurality of recording sessions during the particular timeframe, wherein media clip files are sorted into the second sequence based on recording device identifying data in the media clip files identifying a second media recording device used to capture the media clip files of the second sequence during a second plurality of recording sessions during the particular timeframe, and wherein the media clip files in each sequence are spaced apart from each other by respective non-zero actual elapsed time between a stoppage of one recording session and a start of a next recording;

performing pre-processing operations on the media clip files, the pre-processing operations comprising one of filtering out noise, applying equalization to target specific frequencies, normalizing balance levels, and applying dynamics processing to balance levels;

analyzing content data of the media clip files to group media clip files that temporally overlap, wherein each media clip file in a group is from a different sequence; and placing the groups of media clip files in an order based on instances in time during the particular timeframe at which the media clip files were captured.

11. The method of claim 10, wherein performing the automated process further comprises aligning the media clip files included in each group of media clip files according to audio content of the media clip files.

12. The method of claim 10, wherein arranging the media clip files into sequences based on the media recording devices comprises identifying a media recording device identifier provided on each media clip file, and wherein analyzing content data of the media clip files comprises:

determining temporal data associated with the media clip files; and sorting the media clip files of each set in chronological order according to the temporal data associated with the media clip files.

13. The method of claim 12, wherein analyzing content data of the media clip files further comprises:

correlating audio content of a media clip file from each of two arranged sequences to produce a correlation function;

identifying a peak value of the correlation function; and determining a time offset between the two arranged sequences based on whether the peak value of the correlation function satisfies a threshold value that is based on a statistical analysis of the correlation function between the audio content of the media clip files.

14. The method of claim 10, wherein analyzing content data of the media clip files to group media clip files that temporally overlap comprises:

identifying media clip files from different sequences that are time-coincident media clip files, wherein two time-coincident media clip files comprise content captured from the same event during the same time period; and placing the time-coincident media clip files into a single contents structure.

15. The method of claim 10, wherein the particular timeframe is a user determined timeframe representing a duration of the plurality of recording sessions.

16. The method of claim 10, wherein each of the plurality of media clip files to be imported and automatically processed is determined by detecting the plurality of recording sessions from which the plurality of media clip files captured by the plurality of media recording devices during the particular timeframe originate.

17. The method of claim 10, wherein grouped media clip files that temporally overlap are formed into multi-clips that represent time-coincident media clip files of the same recorded event.

18. A method of organizing media clip files captured by a recording device, the method comprising:

arranging a plurality of media clip files into a first sequence of media clip files and a second sequence of media clip files, wherein media clip files are sorted into the first sequence based on recording device identifying data in the media clip files identifying a first media recording device used to capture the media clip files of the first sequence during a first plurality of recording sessions during the particular timeframe, wherein media clip files are sorted into the second sequence based on recording device identifying data in the media clip files identifying a second media recording device used to capture the media clip files of the second sequence during a second plurality of recording sessions during the particular timeframe, and wherein the media clip files in each sequence are spaced apart from each other by respective non-zero actual elapsed time between a stoppage of one recording session and a start of a next recording session;

performing pre-processing operations on the media clip files, the pre-processing operations comprising one of filtering out noise, applying equalization to target specific frequencies, normalizing balance levels, and applying dynamics processing to balance levels;

determining a time offset between the first sequence and the second sequence by comparing audio content of a first media clip file from the first sequence to audio content of a plurality of media clip files from the second sequence;

applying the time offset to shift all of the media clip files in the first sequence in relation to the media clip files in the second sequence; and merging media clip files from the first and second sequences determined to be temporally overlapping.

19. The method of claim 18 further comprising placing the merged media clip files in an order indicative of a chronological sequence by which the media clip files were captured.

20. The method of claim 18 further comprising temporally aligning the merged media clip files according to audio content of the merged media clip files.

21. The method of claim 20, wherein temporally aligning the merged media clip files comprises aligning the merged media clip files based on a fine-tune time offset determined by correlating audio content of the merged media clip files.

22. The method of claim 21, wherein correlating audio content of the merged media clip files comprises performing a frequency domain phase correlation of the merged clip files to generate a correlation function, wherein the fine-tune time offset corresponds to a resulting peak value of the correlation function when the peak value satisfies a threshold value that is based on a statistical analysis of the correlation function performed on the candidate media clip files.

23. The method of claim 18 further comprising adjusting the alignment of the first sequence and the second sequence to compensate for time drift.

24. The method of claim 23, wherein adjusting the alignment comprises:
   calculating a difference between a first offset of a first pair of overlapping media clip files and a second offset of a second pair of overlapping media clip files; and
   adjusting a temporal position of the media clip files in the first sequence and the second sequence based on the calculated difference of the first and second offsets.

25. The method of claim 18 further comprising adjusting a first media clip file of the merged media clip files to compensate for time drift.

26. The method of claim 25, wherein the first media clip of the merged media clips is from the first sequence, wherein adjusting the alignment comprises:
   calculating a difference between a first offset of a first subsection of each of the first media clip file and a second media clip file and a second offset of a second subsection of each of the first media clip file and the second media clip file, the second media clip file being of the merged media clip files and from the second sequence; and
   adjusting content data of the first media clip file based on the calculated difference of the first and second offsets.

27. A non-transitory computer readable medium storing a computer program which when executed by at least one processor organizes media clip files captured by a plurality of media recording devices, the computer program comprising sets of instructions for:
   arranging a plurality of media clip files into a first sequence of media clip files and a second sequence of media clip files, wherein media clip files are sorted into the first sequence based on recording device identifying data in the media clip files identifying a first recording device used to capture the media clip files of the first sequence during a first plurality of recording sessions, wherein media clip files are sorted into the second sequence based on recording device identifying data in the media clip files identifying a second recording device used to capture the media clip files of the second sequence during a second plurality of recording sessions, and wherein the media clip files in each sequence are spaced apart from each other by respective non-zero actual elapsed time between a stoppage of one recording session and a start of a next recording session;
   performing pre-processing operations on the media clip files, the pre-processing operations comprising one of filtering out noise, applying equalization to target specific frequencies, normalizing balance levels, and applying dynamics processing to balance levels;
   analyzing content date of the media clip files in the first sequence and the second sequence to identify a pair of candidate media clip file in the sequences that temporally overlap;
   analyzing the candidate media clip files to determine a time offset between the candidate clip files; and
   applying the time offset to shift all of the media clip files in the first sequence in relation to the media clip files in the second.

28. The non-transitory computer readable medium of claim 27, wherein the set of instructions for arranging the media clip files into sequences comprises the set of instructions for putting the media clip files of each of the sequences into chronological order according to time code data associated with the media clip files.

29. A non-transitory computer readable medium storing a computer program which when executed by at least one processor organizes media clip files, the computer program comprising sets of instructions for:
   arranging a plurality of media clip files into a first sequence of media clip files and a second sequence of media clip files, wherein media clip files are sorted into the first sequence based on recording device identifying data in the media clip files identifying a first recording device used to capture the media clip files of the first sequence during a first plurality of recording sessions, wherein media clip files are sorted into the second sequence based on recording device identifying data in the media clip files identifying a second recording device used to capture the media clip files of the second sequence during a second plurality of recording sessions, and wherein the media clip files in each sequence are spaced apart from each other by respective non-zero actual elapsed time between a stoppage of one recording session and a start of a next recording session;
   performing pre-processing operations on the media clip files, the pre-processing operations comprising one of filtering out noise, applying equalization to target specific frequencies, normalizing balance levels, and applying dynamics processing to balance levels;
   determining a time offset between the first sequence and the second sequence by comparing audio content of a first media clip file from the first sequence to audio content of a plurality of media clip files from the second sequence;
   applying the time offset to shift all of the media clip files in the first sequence in relation to the media clip files in the second sequence; and
   merging media clip files from the first and second sequences determined to be temporally overlapping.

30. The non-transitory computer readable medium of claim 29, wherein the computer program further comprises a set of instructions for adjusting a first media clip file of the merged media clip files to compensate for time drift.

31. The non-transitory computer readable medium of claim 29, wherein the computer program further comprises a set of instructions for temporally aligning the merged media clip files according to audio content of the merged media clip files.

* * * * *